(12) United States Patent
Opshaug et al.

(10) Patent No.: US 10,469,217 B2
(45) Date of Patent: Nov. 5, 2019

(54) DISENTANGLED ORTHOGONAL FREQUENCY DIVISION MULTIPLEXING FOR NAVIGATION AND POSITIONING SIGNALS

(71) Applicant: QUALCOMM Incorporated, San Diego, CA (US)

(72) Inventors: Guttorm Ringstad Opshaug, Redwood City, CA (US); Stephen William Edge, Escondido, CA (US); Sven Fischer, Nuremberg (DE); Naga Bhushan, San Diego, CA (US); Rayman Wai Pon, Cupertino, CA (US); Jie Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/053,112

(22) Filed: Aug. 2, 2018

(65) Prior Publication Data

US 2019/0312689 A1 Oct. 10, 2019

Related U.S. Application Data

(60) Provisional application No. 62/654,065, filed on Apr. 6, 2018.

(51) Int. Cl.
*G01S 5/10* (2006.01)
*H04L 5/00* (2006.01)
(Continued)

(52) U.S. Cl.
CPC ........... *H04L 5/001* (2013.01); *H04W 72/044* (2013.01); *G01S 5/10* (2013.01); *G01S 19/13* (2013.01);
(Continued)

(58) Field of Classification Search
CPC ... H04W 72/044; H04W 52/46; H04W 84/22; H04W 68/025; H04W 88/06;
(Continued)

(56) References Cited

U.S. PATENT DOCUMENTS 5,838,268 A * 11/1998 Frenkel .............. H04L 5/06
341/111
2012/0094687 A1 4/2012 Choi et al.
(Continued)

FOREIGN PATENT DOCUMENTS

WO 2018052239 A1 3/2018

OTHER PUBLICATIONS

International Search Report and Written Opinion—PCT/US2019/020757—ISA/EPO—dated May 21, 2019.

*Primary Examiner* — Mewale A Ambaye
(74) *Attorney, Agent, or Firm* — Kilpatrick Townsend & Stockton, LLP

(57) ABSTRACT

Many mobile devices and mobile networks utilize orthogonal frequency division multiplexing (OFDM) to calculate position information of mobile devices within the network. However, the Doppler Effect and other noise or obstructions can cause OFDM signals to become entangled, particularly when the mobile device is moving, making the calculated position information inaccurate. Described herein are systems and methods for disentangling the OFDM signals by calculating a symbol length for the signals that is longer than the minimum symbol length, which is used in traditional OFDM. Selecting a longer symbol length reduces the Doppler Effect and other noise on the signals, making positioning calculations more accurate.

20 Claims, 16 Drawing Sheets

(51) Int. Cl.
*H04W 72/04* (2009.01)
*G01S 19/13* (2010.01)
*H04W 16/14* (2009.01)

(52) U.S. Cl.
CPC ............ *H04W 16/14* (2013.01); *H04W 72/04* (2013.01); *H04W 72/042* (2013.01); *H04W 72/0446* (2013.01)

(58) Field of Classification Search
CPC ... H04W 16/14; H04W 72/04; H04W 72/042; H04W 72/0446; G01S 5/10; G01S 19/13
See application file for complete search history.

(56) References Cited

U.S. PATENT DOCUMENTS

| | | | |
|---|---|---|---|
| 2017/0215078 A1* | 7/2017 | Mochizuki | H04W 4/90 |
| 2017/0238301 A1* | 8/2017 | Nakazawa | H04J 11/00 |
| | | | 370/329 |
| 2017/0245272 A1* | 8/2017 | Li | H04W 72/04 |
| 2017/0290042 A1* | 10/2017 | Islam | H04W 72/1252 |
| 2018/0091373 A1 | 3/2018 | Manolakos et al. | |
| 2019/0037551 A1* | 1/2019 | Cheng | H04W 72/0406 |
| 2019/0044639 A1* | 2/2019 | Ouchi | H04J 11/0073 |
| 2019/0052503 A1* | 2/2019 | Hayashi | H04W 76/27 |
| 2019/0052504 A1* | 2/2019 | Hayashi | H04L 5/001 |

* cited by examiner

|    | 15 kHz | 30 kHz | 60 kHz | 120 kHz | 240 kHz | 480 kHz |
|---|---|---|---|---|---|---|
| 1  | 1ms/14 _402_ | 1ms/14 _414_ | 1ms/14 _426_ | 1ms/14 _438_ | 1ms/14 _450_ | 1ms/14 _462_ |
| 2  | XXX _404_ | 1ms/(2*14) _416_ | 1ms/(2*14) _428_ | 1ms/(2*14) _440_ | 1ms/(2*14) _452_ | 1ms/(2*14) _464_ |
| 4  | XXX _406_ | XXX _418_ | 1ms/(4*14) _430_ | 1ms/(4*14) _442_ | 1ms/(4*14) _454_ | 1ms/(4*14) _466_ |
| 8  | XXX _408_ | XXX _420_ | XXX _432_ | 1ms/(8*14) _444_ | 1ms/(8*14) _456_ | 1ms/(8*14) _468_ |
| 16 | XXX _410_ | XXX _422_ | XXX _434_ | XXX _446_ | 1ms/(16*14) _458_ | 1ms/(16*14) _470_ |
| 32 | XXX _412_ | XXX _424_ | XXX _436_ | XXX _448_ | XXX _460_ | 1ms/(32*14) _472_ |

DISENTANGLED ORTHOGONAL FREQUENCY DIVISION MULTIPLEXING FOR NAVIGATION AND POSITIONING SIGNALS

RELATED APPLICATIONS

This application claims the benefit of U.S. Provisional Application No. 62/654,065, filed Apr. 6, 2018, entitled "DISENTANGLED ORTHOGONAL FREQUENCY DIVISION MULTIPLEXING FOR NAVIGATION AND POSITIONING SIGNALS," of which is assigned to the assignee hereof, and incorporated herein in its entirety by reference.

BACKGROUND

1. Field

The subject matter disclosed herein relates to electronic devices, and more particularly to methods and apparatuses for use to support navigation and location of a mobile device using a wireless communication network.

2. Information

Obtaining the location or position of a mobile device that is accessing a wireless network may be useful for many applications including, for example, emergency calls, personal navigation, asset tracking, locating a friend or family member, etc. Existing position methods include methods based on measuring radio signals transmitted from a variety of devices including satellite vehicles (SVs) and terrestrial radio sources in a wireless network such as base stations and access points. In some cases, the radio signals transmitted from the radio sources are arranged for orthogonal frequency division multiplexing (OFDM) so that the radio signals can be transmitted on multiple subcarrier frequencies. In wireless networks, the mobile device may be moving, which can cause a Doppler Effect on the transmitted signals at the mobile device. The Doppler Effect can cause substantial reduction in accuracy of the location and navigation calculations based on the transmitted signals. Embodiments disclosed herein address these issues by implementing techniques that mitigate the Doppler Effect on transmitted signals using OFDM to enable accurate positioning and location of mobile devices in wireless communication networks.

BRIEF DESCRIPTION OF DRAWINGS

Non-limiting and non-exhaustive aspects are described with reference to the following figures.

FIG. 4 illustrates a table of options of number of slots per sub-frame to frequency spacing values, according to an embodiment.

Figure 1:
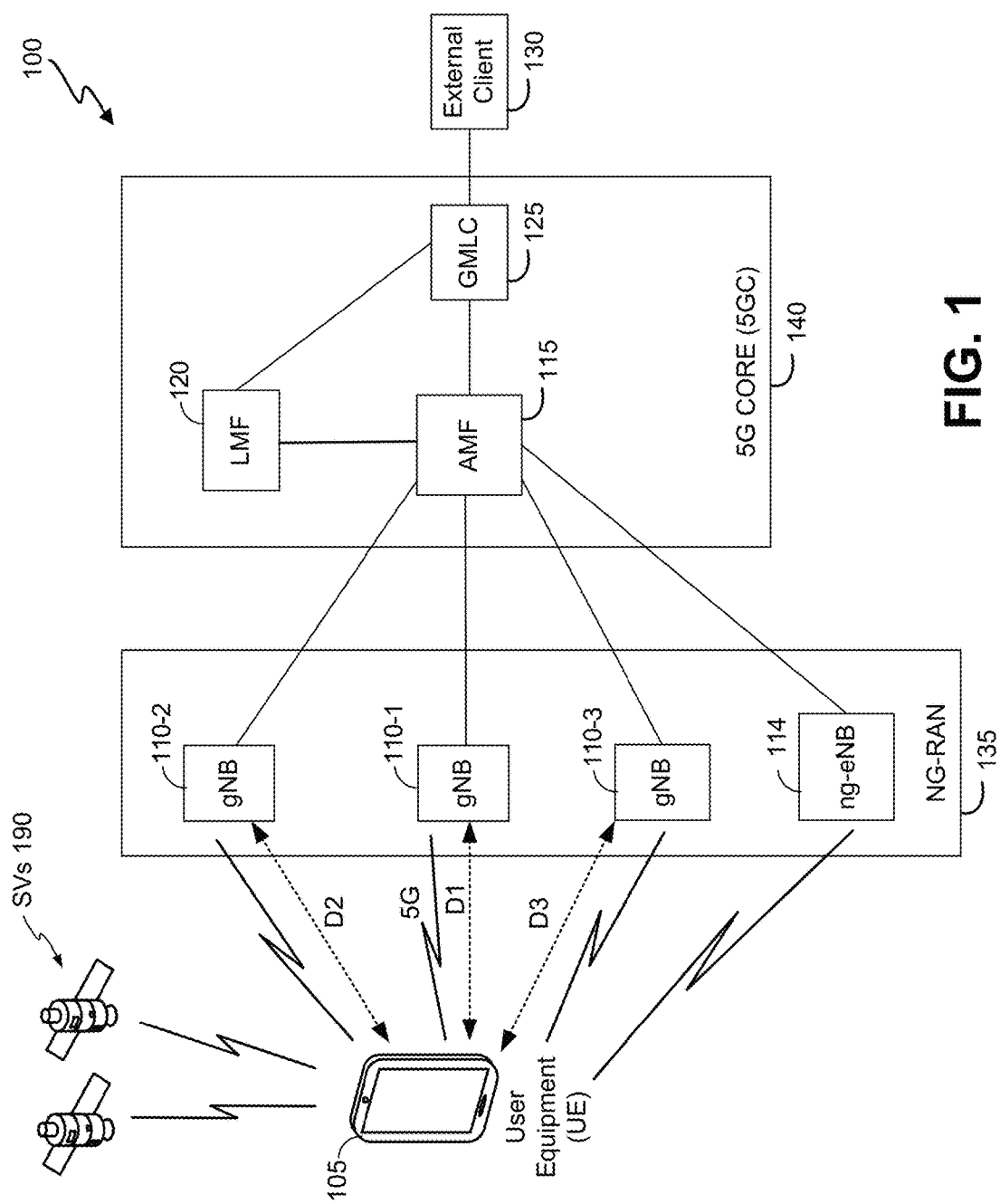
FIG. 1 illustrates a diagram of a communication system that may utilize a 5G cellular network to determine a position for a user equipment (UE), according to an embodiment.

Like reference numbers and symbols in the various figures indicate like elements, in accordance with certain example implementations. In addition, multiple instances of an element may be indicated by following a first number for the element with a hyphen and a second number. For example, multiple instances of an element 110 may be indicated as 110-1, 110-2, 110-3 etc. When referring to such an element using only the first number, any instance of the element is to be understood (e.g., elements 110 in the previous example would refer to elements 110-1, 110-2 and 110-3).

DETAILED DESCRIPTION

Some example techniques for determining the location of a user equipment (UE) are presented herein, which may be implemented at the UE (e.g., a mobile device or mobile station), a location server (LS), a base station, and/or other devices. These techniques can be utilized in a variety of applications utilizing various technologies and/or standards, including 3rd Generation Partnership Project (3GPP), Open Mobile Alliance (OMA) Long Term Evolution (LTE) Positioning Protocol (LPP) and/or LPP Extensions (LPPe), Wi-Fi®, Global Navigation Satellite System (GNSS), and the like.

A UE may comprise a mobile device such as, a mobile phone, smartphone, tablet or other mobile computer, a portable gaming device, a personal media player, a personal navigation device, a wearable device, an in-vehicle device, or other electronic device. Position determination of a UE can be useful to the UE and/or other entities in a wide variety of scenarios. There are many methods already known to determine an estimated position of the UE, including methods that involve communicating measurement and/or other information between the UE and an LS.

Positioning methods can be based on Observed Time Difference Of Arrival (OTDOA), pseudoranges, angle-of-arrival (AoA), angle-of-departure (AoD), received power level, and/or round-trip time (RTT) of positioning signals from radio sources. With OTDOA, a UE measures time differences, referred to as Reference Signal Time Differences (RSTDs), between reference signals transmitted by one or more pairs of base stations. The reference signals may be signals that are intended only for positioning, such as the LTE Positioning Reference Signals (PRS) or may be signals intended also for serving cell timing and frequency acquisition, such as LTE Cell-specific Reference Signals (CRS) or the 5G Tracking Reference Signals (TRS). If a UE is able to measure two or more RSTDs between two or more different pairs of base stations (typically comprising a common reference base station in each pair and different neighbor base stations), the horizontal UE location can be obtained if the antenna locations and the relative timing of the base stations are known. In some cases, OFDM is used and the signals (e.g., PRS, CRS, or TRS) are arranged on subcarrier frequencies to, for example, simplify channel equalization. However, the Doppler Effect can cause one subcarrier frequency from one cell supported by a first base station to interfere with the subcarrier frequency of a different cell supported by a second base station, creating noise in the received signal (e.g., PRS, CRS, or TRS). Such inter-carrier-interference (ICI) may affect the accuracy of the location and/or position determination of the UE.

It is expected that fifth-generation (5G) standardization will include support for positioning methods based on OTDOA, power measurements, and RTT. The techniques, methods, and systems described herein can be applied to 5G wireless communication networks in addition to existing network infrastructures.

Embodiments described herein are directed to techniques for determining the position or location of a mobile device by disentangling the OFDM signals to mitigate the Doppler Effect on positioning determination in mobile networks.

FIG. 1 illustrates is a diagram of a communication system 100 that may utilize a 5G network to determine a position a UE 105 using OTDOA-based positioning methods, according to an embodiment. Here, the communication system 100 comprises a UE 105 and a 5G network comprising a Next Generation (NG) Radio Access Network (RAN) (NG-RAN) 135 and a 5G Core Network (5GC) 140, which, along with providing OTDOA-based positioning, may provide data and voice communication to the UE 105. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in 3GPP. Accordingly, NG-RAN 135 and 5GC 140 may conform to current or future standards for 5G support from 3GPP. The communication system 100 may further utilize information from GNSS satellite vehicles (SVs) 190. Additional components of the communication system 100 are described below. It will be understood that a communication system 100 may include additional or alternative components.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, and so forth) may utilize the communication system 100. Similarly, the communication system 100 may include a larger (or smaller) number of SVs 190, gNBs 110, ng-eNBs 114, Access and Mobility Management Functions (AMFs) 95, external clients 130, and/or other components. The illustrated connections that connect the various components in the communication system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL) Enabled Terminal (SET), or by some other name. Moreover, as noted above, UE 105 may correspond to any of a variety of devices, including a cellphone, smartphone, laptop, tablet, PDA, tracking device, navigation device, Internet of Things (IoT) device, or some other portable or moveable device. Typically, though not necessarily, the UE 105 may support wireless communication using one or more Radio Access Technologies (RATs) such as using Global System for Mobile Communications (GSM), Code Division Multiple Access (CDMA), Wideband CDMA (WCDMA), Long Term Evolution (LTE), High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and 5GC 140), and so forth. The UE 105 may also support wireless communication using a Wireless Local Area Network (WLAN) which may connect to other networks (e.g., the Internet) using a Digital Subscriber Line (DSL) or packet cable for example. The use of one or more of these RATs may enable the UE 105 to communicate with an external client 130 (e.g., via elements of 5GC 140 not shown in FIG. 1 or possibly via Gateway Mobile Location Center (GMLC) 125) and/or enable the external client 130 to receive location information regarding the UE 105 (e.g., via GMLC 125).

The UE 105 may comprise a single entity or may comprise multiple entities such as in a personal area network where a user may employ audio, video, data I/O devices and/or body sensors, and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above mean sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geographically or in civic form) within which the UE 105 is expected to be located with some probability or confidence level (e.g., 67%, 95%, or the like). A location of the UE 105 may further be a relative location comprising, for example, a distance and direction or relative X, Y (and optionally Z) coordinates defined relative to some origin at a known location which may be defined geographically, in civic terms, or by reference to a point, area, or volume indicated on a map, floor plan, or building plan. In the description contained herein, the use of the term location may comprise any of these variants unless indicated otherwise.

Base stations in the NG-RAN 135 may comprise NR Node Bs, which are more typically referred to as gNBs. In FIG. 1, three gNBs are shown—gNBs 110-1, 110-2, and 110-3, which are collectively and generically referred to herein as gNBs 110. However, a typical NG RAN 135 could comprise dozens, hundreds, or even thousands of gNBs 110. Pairs of gNBs 110 in NG-RAN 135 may be connected to one another (not shown in FIG. 1). Access to the 5G network is provided to UE 105 via wireless communication between the UE 105 and one or more of the gNBs 110, which may provide wireless communications access to the 5GC 140 on behalf of the UE 105 using 5G (also referred as NR). In FIG. 1, the serving gNB for UE 105 is assumed to be gNB 110-1, although other gNBs (e.g., gNB 110-2 and/or gNB 110-3) may act as a serving gNB if UE 105 moves to another location or may act as a secondary gNB to provide additional throughput and bandwidth to UE 105.

Base stations (BSs) in the NG-RAN 135 shown in FIG. 1 may also or instead include a next generation evolved Node B, also referred to as an ng-eNB 114. Ng-eNB 114 may be connected to one or more gNBs 110 in NG-RAN 135 (not shown in FIG. 1), for example either directly or indirectly, via other gNBs 110, and/or via other ng-eNBs. An ng-eNB 114 may provide LTE wireless access and/or evolved LTE (eLTE) wireless access to UE 105. Some gNBs 110 (e.g., gNB 110-2) and/or ng-eNB 114 in FIG. 1 may be configured to function as positioning-only beacons which may transmit signals (e.g., positioning measurements signals as described herein) and/or may broadcast assistance data to assist positioning of UE 105 but may not receive signals from UE 105 or from other UEs. It is noted that while only one ng-eNB 114 is shown in FIG. 1, the description below sometimes assumes the presence of multiple ng-eNBs 114.

As noted, while FIG. 1 depicts nodes configured to communicate according to 5G communication protocols, nodes configured to communicate according to other communication protocols, such as, for example, an LPP protocol or IEEE 802.11x protocol, may be used. For example, in an Evolved Packet System (EPS) providing LTE wireless access to UE 105, a RAN may comprise an Evolved Universal Mobile Telecommunications System (UMTS) Terrestrial Radio Access Network (E-UTRAN) which may comprise base stations comprising evolved Node Bs (eNBs) supporting LTE wireless access. A core network for EPS may comprise an Evolved Packet Core (EPC). An EPS may then comprise an E-UTRAN plus EPC, where the E-UTRAN corresponds to NG-RAN 135 and the EPC corresponds to 5GC 140 in FIG. 1. The position measurement signals described herein for support of UE 105 positioning may be applicable to such other networks.

The gNBs 110 and ng-eNB 114 can communicate with an AMF 115, which, for positioning functionality, can communicate with a Location Management Function (LMF) 120. The AMF 115 may support mobility of the UE 105, including cell change and handover, and may participate in supporting a signaling connection to the UE 105 and possibly data and voice bearers for the UE 105. The LMF 120 may support positioning of the UE 105 when UE 105 accesses the NG-RAN 135 and may support position methods such as Observed Time Difference of Arrival (OTDOA) (which can utilize the positioning measurement signals described herein) and others. The LMF 120 may also process location services requests for the UE 105 (e.g., received from the AMF 115 or from the GMLC 125). The LMF 120 may be connected to AMF 115 and/or to GMLC 125. It is noted that in some embodiments, at least part of the positioning functionality, including derivation of a UE 105 location, may be performed at the UE 105 (e.g., using signal measurements obtained by UE 105 for position measurement signals transmitted by wireless nodes such as gNBs 110 and ng-eNB 114 and assistance data provided to the UE 105, for example, by LMF 120).

The Gateway Mobile Location Center (GMLC) 125 may support a location request for the UE 105 received from an external client 130. GMLC 125 may forward such a location request to the AMF 115 for forwarding by the AMF 115 to the LMF 120. Optionally, GMLC 125 may forward the location request directly to the LMF 120. A location response from the LMF 120 (e.g., containing a location estimate for the UE 105) may be similarly returned to the GMLC 125 either directly or via the AMF 115, and the GMLC 125 may then return the location response (e.g., containing the location estimate) to the external client 130. The GMLC 125 is shown connected to both the AMF 115 and LMF 120 in FIG. 1 though only one of these connections may be supported by 5GC 140 in some implementations.

As noted, while the communication system 100 is described in relation to 5G technology, the communication system 100 may be implemented to support other communication technologies, such as GSM, WCDMA, LTE, and the like, that are used for supporting and interacting with mobile devices such as the UE 105 (e.g., to implement voice, data, positioning, and other functionalities). In some such embodiments, the 5GC 140 may be configured to control different air interfaces. For example, in some embodiments, 5GC 140 may be connected to a WLAN using a Non-3GPP InterWorking Function (N3IWF, not shown FIG. 1) in the 5GC 140. For example, the WLAN may support IEEE 802.11 WiFi access for UE 105 and may comprise one or more WiFi APs. Here, the N3IWF may connect to the WLAN and to other elements in the 5GC 140, such as AMF 115. In some other embodiments, both the NG-RAN 135 and the 5GC 140 may be replaced by other RANs and other core networks. For example, in an EPS, the NG-RAN 135 may be replaced by an E-UTRAN containing eNBs, and the 5GC 140 may be replaced by an EPC containing a Mobility Management Entity (MME) in place of the AMF 115, an Evolved Serving Mobile Location Center (E-SMLC) in place of the LMF 120, and a GMLC that may be similar to the GMLC 125. In such an EPS, the E-SMLC may send and receive location information to and from the eNBs in the E-UTRAN and may support positioning of UE 105. In these other embodiments, positioning of a UE 105 may be supported in an analogous manner to that described herein for a 5G network with the difference that functions and procedures described herein for gNBs 110, ng-eNB 114, AMF 115 and LMF 120 may, in some cases, apply instead to other network elements such eNBs, WiFi APs, an MME, and an E-SMLC.

Position determination of the UE 105 by the communication system 100 typically involves determining a distance between the UE 105 and each of a plurality of base stations 110, 114 (e.g., distances D1, D2, and D3 between the UE 105 and GNBs 110-1, 110-2, and 110-3, respectively) and using trilateration to determine the UE's location. As noted above, to determine these distances, the UE 105 can measure position measurement signals (including the reference signals discussed herein below) transmitted by these base stations 110, 114. Position determination using OTDOA based on RSTD measurements, for example, typically requires either synchronization of the transmission of these reference signals by the base stations 110, 114 or knowledge obtained in some other way of the RTTs between pairs of base stations 110, 114. The LMF 120 typically has this knowledge, and thus, position determination in asynchronous networks based on measurements taken by the UE 105 of the various base stations 110, 114 can involve, for example, the LMF 120 determining the position of the UE 105 after receiving the measurements from the UE 105, or the UE 105 determining its own position after receiving RTT information from the LMF 120. In LTE networks, positioning reference signals (PRSs) are typically used to make these RSTD measurements for OTDOA positioning.

Figure 2:
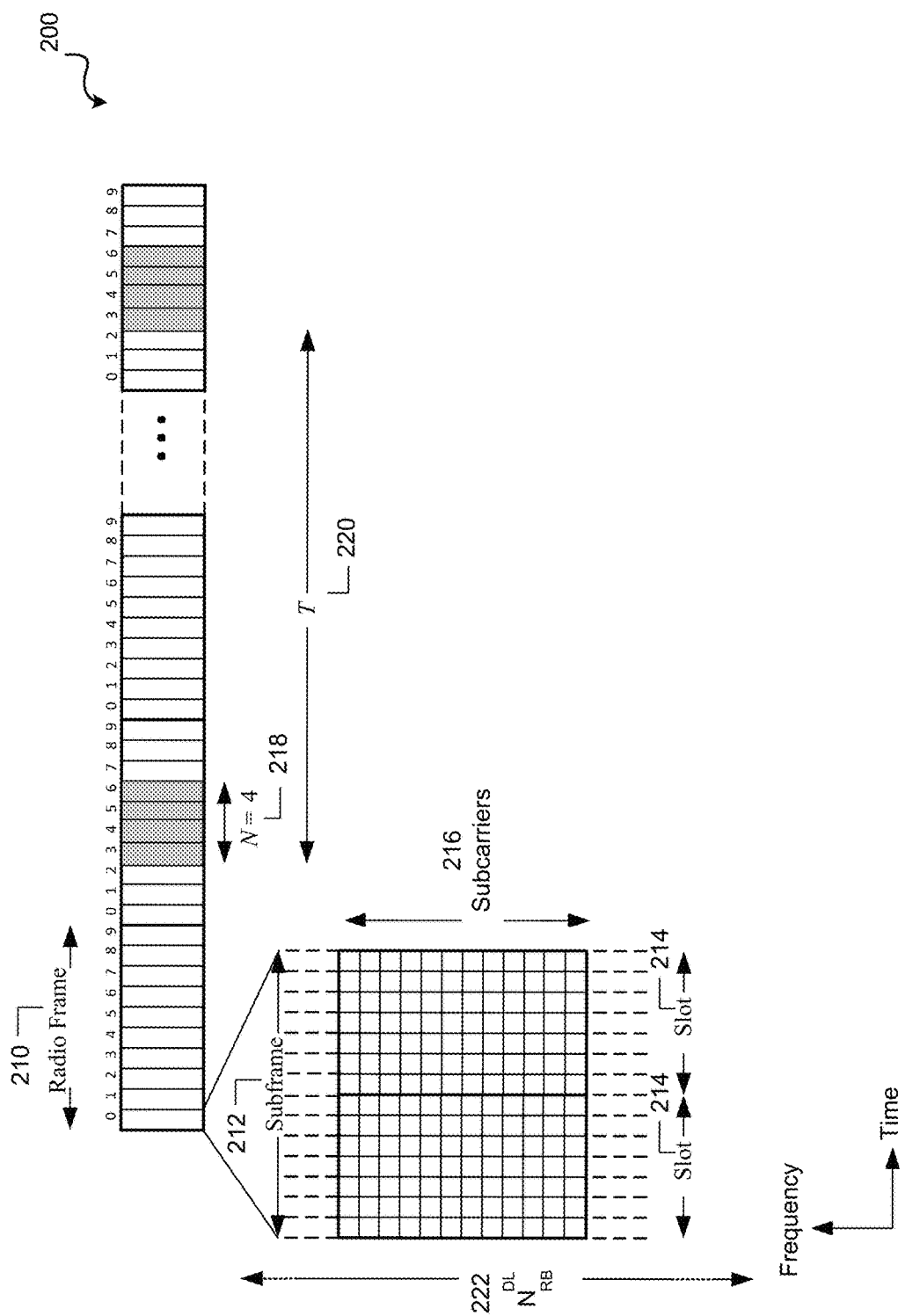
FIG. 2 illustrates high-level signal structure of an OFDM signal.

FIG. 2 illustrates high-level signal structure of an OFDM signal showing a multitude of symbols that define a slot, one (1) or more slots that define a sub-frame, and a multitude of sub-frames that define a radio frame. As an example, the description below will use the example of and LTE sub-frame sequence with PRS positioning occasions, provided for reference. In FIG. 2, time is represented horizontally (e.g., on an X-axis) with time increasing from left to right, while frequency is represented vertically (e.g., on a Y-axis) with frequency increasing (or decreasing) from bottom to top, as illustrated. As shown in FIG. 2, downlink and uplink Radio Frames 210 are depicted. As an example, in LTE networks, the downlink and uplink radio frames 210 are of 10 ms duration each. Continuing the LTE example, for downlink Frequency Division Duplex (FDD) mode, Radio Frames 210 are organized into ten sub-frames 212 of 1 ms duration each. Each sub-frame 212 comprises two slots 214, each of 0.5 ms duration (i.e., slot length is 0.5 ms). In LTE, these radio frames 210 are transmitted by base stations similar to base stations 110, 114 of FIG. 1. PRS may be detected by any UE in the area and are therefore considered to be "broadcast" by these base stations.

In the frequency domain, the available bandwidth may be divided into uniformly spaced orthogonal subcarriers 216. For example, for a normal length cyclic prefix using 15 kHz spacing, subcarriers 216 may be grouped into a group of 12 subcarriers or "frequency bins." Not depicted but as another option, an extended length cyclic prefix using 15 kHz spacing, subcarriers may be grouped into a group of 14 subcarriers or frequency bins. Each grouping, which comprises 12 subcarriers 216 is termed a "resource block" (or "physical resource block" (PRB)) and, in the example, the number of subcarriers in the resource block may be written as $N_{SC}^{RB}=12$. For a given channel bandwidth, the number of available resource blocks on each channel 222, which is also called the transmission bandwidth configuration 222, is indicated as $N_{RB}^{DL}$ 222. For example, for a 3 MHz channel bandwidth in the above example, the number of available resource blocks on each channel 222 is given by $N_{RB}^{DL}=15$.

Resource blocks therefore can be described as a unit of frequency and time resources. In the LTE example, the resource block comprises one sub-frame 212 (two slots 214) of radio frame 210 and 12 subcarriers. Each slot 214 comprises 6 (or in some cases 7 in LTE networks) periods, or "symbols," during which a base station (for downlink (DL) radio frames) or UE (for uplink (UL) radio frames) may transmit RF signals. Each 1 subcarrier×1 symbol cell in the 12×12 or 14×12 grid represents a "resource element" (RE), which is the smallest discrete part of the frame and contains a single complex value representing data from a physical channel or signal.

A signal, like PRS, may be transmitted in special positioning sub-frames that are grouped into positioning "occasions." For example, in LTE, a PRS occasion can comprise a number N of consecutive positioning sub-frames 218 where the number N may be between 1 and 160 (e.g., may include the values 1, 2, 4 and 6 as well as other values). The PRS occasions for a cell supported by a base station may occur periodically at intervals 220, denoted by a number T, of millisecond (or sub-frame) intervals where T may equal 5, 10, 20, 40, 80, 160, 320, 640, or 1280. As an example, FIG. 2 illustrates a periodicity of PRS occasions where N equals 4 and T is greater than or equal to 20. In some embodiments, T may be measured in terms of the number of sub-frames between the start of consecutive PRS occasions.

PRS can be deployed with a pre-defined bandwidth, which may be provided, from a location server via a serving base station, to a UE along with other PRS configuration parameters (e.g., N, T, any muting and/or frequency hopping sequences, PRS ID) and position determination information. Generally speaking, the higher the allocated bandwidth for PRS, the more accurate the position determination, so there is a tradeoff between performance and overhead.

For the 5G standard, it is anticipated that radio frames will be similar to the structure for LTE illustrated in FIG. 2, however, certain characteristics (e.g., timing, available bandwidth, and so forth) may vary. Additionally, the characteristics of a new position measurement signal to replace PRS may vary as well to enable this new reference signal to provide accurate measurements, be robust to multipath, provide a high level of orthogonality and isolation among cells, and consume relatively low UE power, above and beyond the current characteristics of PRS.

Figure 3A:
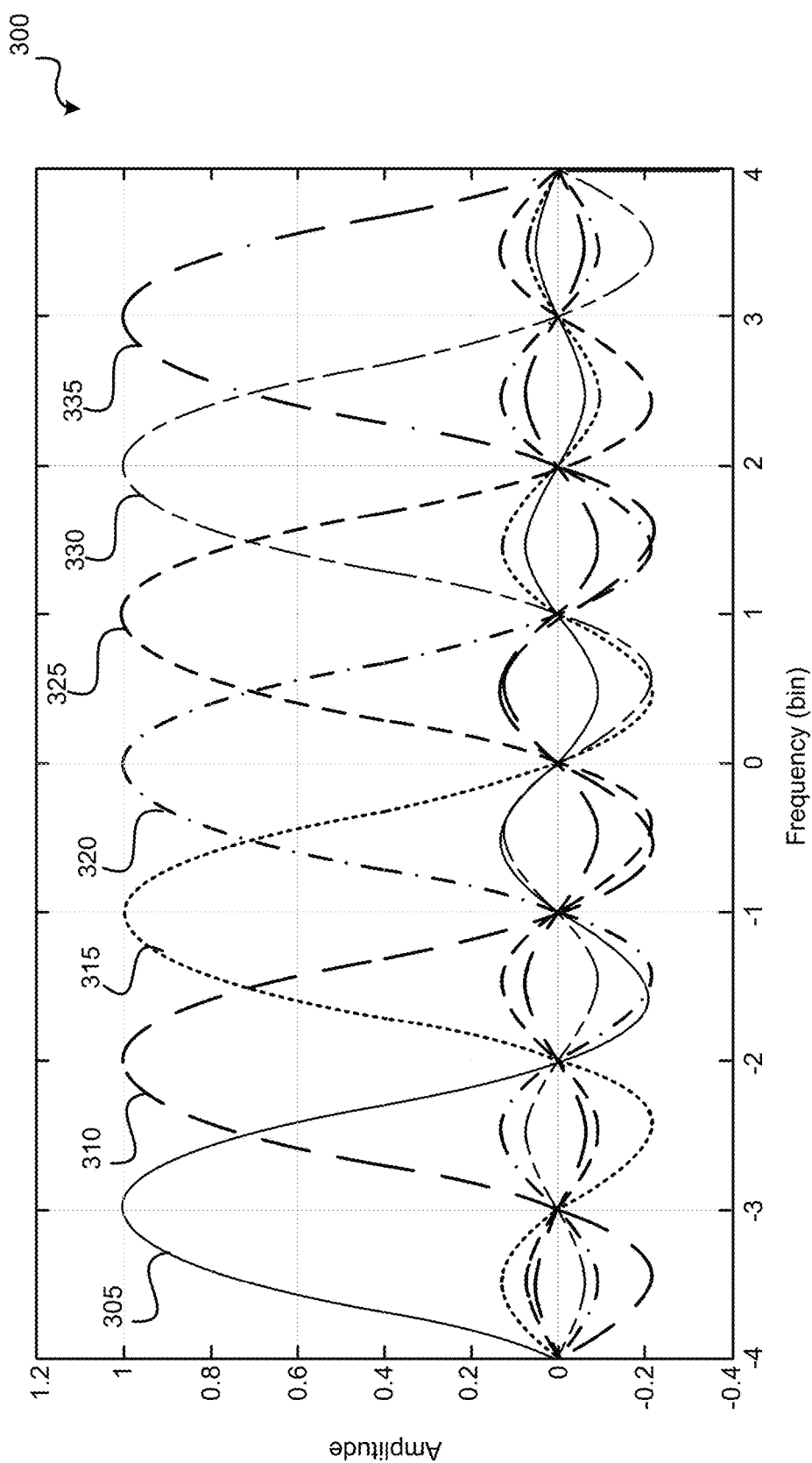
FIG. 3A illustrates a graph representing the amplitude versus the frequency bin of positioning measurement signals as received by a UE using orthogonal frequency division multiplexing (OFDM), according to an embodiment.

FIG. 3A illustrates a graph 300 representing the amplitude versus the frequency bin of positioning measurement signals as received by a UE using orthogonal frequency division multiplexing (OFDM). Graph 300 shows amplitude on the Y-axis over frequency bins of −4 through 4 on the X-axis.

As previously discussed, positioning methods can be based on Observed Time Difference Of Arrival (OTDOA), received signal power, and round-trip time (RTT) of positioning signals from radio sources. With OTDOA, a UE measures time differences, referred to as Reference Signal Time Differences (RSTDs), between reference signals transmitted by one or more pairs of radio signal sources (e.g., base stations). Orthogonal Frequency Division Multiplexing (OFDM) can be used such that each base station can transmit on a designated subcarrier frequency at a specific time.

FIG. 2 is useful in describing OFDM. In FIG. 2, the available bandwidth is divided into uniformly spaced orthogonal subcarriers 216. Each uniformly spaced orthogonal subcarrier 216 can be considered a frequency bin or a defined subcarrier frequency spacing. For example, each frequency bin (i.e., defined subcarrier frequency spacing) can be 15 kHz. In such an example, each orthogonal subcarrier 216 is a 15 kHz frequency band of the available bandwidth. Each base station can have a designated subcarrier 216 such that the base station transmits the signal on the designated subcarrier 216. The base station modulates the signal, and the receiving UE can demodulate the signal using Fast Fourier Transform algorithms.

In the time domain, the base stations transmit a signal during a designated symbol. A symbol can be described as a specific period of time during which any given base station may transmit a signal, which may be received, for example, by a UE (e.g., UE 105). Using the example of 7 symbols (such as in LTE networks), there are 7 symbols in each slot (e.g., slot 214). Each slot has a predefined number of symbols, which can be determined by a location server or master controller (e.g., 5GC 140). Because, in the LTE example, a slot is 0.5 ms, each symbol is 0.07 ms (71.4 µSec) (i.e., 0.5 divided by 7). Therefore, the symbol length is 0.07 ms (71.4 µSec). For this example of 7 symbols, the symbols for a slot in an occasion can be envisioned as "symbol 1," "symbol 2," "symbol 3," "symbol 4," "symbol 5," "symbol 6," and "symbol 7" with symbol 1 being the first transmitted symbol and each of the symbols being in order thereafter through symbol 7. The specific time values used are for example explanatory purposes. A slot can be any unit of time, and a slot can contain any number of symbols.

Accordingly, when a base station transmits a signal during a designated symbol on a designated subcarrier, a UE can receive the signal. In some network configurations, a location server can provide information to the UE defining the designated subcarrier and symbol for each base station. Based on the information received from the location server, the UE can listen for the signal from a given base station. For example, if base station is designated symbol 2 and subcarrier frequency band 0-15 kHz, the UE can listen for the signal on that subcarrier frequency band at the designated time (during the designated symbol). Further, because the various base stations are assigned differing subcarriers and/or symbols, the UE can identify signals from many base stations.

Returning to FIG. 3A, the graph 300 depicts 7 sinc-shaped functions 305, 310, 315, 320, 325, 330, and 335 representing 7 signals received using OFDM. The signals are received on different frequency bins (e.g., subcarriers 216). The signals may be received during the same symbol (i.e., same time), but because of the modulation and differing frequency bins, the interference between signals is limited. However, as is discussed herein, environmental factors and movement of the UE (e.g., mobile phone) can increase the interference of one signal on another.

The amplitude of each function in graph 300 is represented on the Y-axis, and the frequency bin of the function is represented on the X-axis of graph 300. Function 305 has a peak amplitude of 1 at frequency bin −3. In an ideal OFDM arrangement (as depicted by graph 300), every other function 310, 315, 320, 325, 330, and 335 has an amplitude of 0 (null) at frequency bin −3. Function 310 has a peak amplitude of 1 at frequency bin −2, and every other function 305, 315, 320, 325, 330, and 335 has an amplitude of 0 (null) at frequency bin −2. This pattern continues at each frequency bin. This arrangement of every other function null when one function peaks allows the signal represented by the function to be received and interpreted by the receiving UE. Further, as depicted by graph 300, in traditional OFDM, the next function peaks at the first null of the previous function. For example, function 305 peaks at frequency bin −3 and the first null after the peak for function 305 is at frequency bin −2. At frequency bin −2 (the first null of function 305), function 310 peaks. Similarly, at frequency bin −1 (the first null of function 310), function 315 peaks. Further, function 305 represents the signal transmitted at frequency bin −3, and function 310 represents the signal transmitted at frequency bin −2. Frequency bin −3 and frequency bin −2 are adjacent subcarriers (e.g., 0-15 kHz and 15-30 kHz). Therefore, as shown in graph 300, the signals in adjacent subcarriers result in functions that peak in the first null after (or before) the other peaks.

The functions 305, 310, 315, 320, 325, 330, and 335 are sinc-shaped. Such a sinc-shape has a peak (i.e., a main lobe), in this example of amplitude 1, and thereafter quickly dissipates to an amplitude of 0 with additional amplitudes of a maximum of approximately −0.2 to 0.1, in this example, with intermediate nulls (0) until the function dissipates to 0 (null) amplitude. A sinc-shaped function results from the equation sinc(x)=sin(πx)/(πx). Stated differently, a sinc-shaped function is a sine wave that decays in amplitude as 1/x. The sinc-shaped function and the rectangular pulse are Fourier transform pairs. The rectangular pulse in the time domain results in a sinc-shaped function in the frequency domain. As x approaches zero (0), the value of the sinc approaches one (1) (i.e., sinc(0)=1). In a perfect sinc function (e.g., with no noise or Doppler Effect), a trait is the location of the zero crossings. The zero crossings occur at frequencies where an integer number of the sinusoid's cycles fit evenly into the rectangular pulse. This is depicted in the sinc-shaped functions 305, 310, 315, 320, 325, 330, and 335 of FIG. 3A. As seen in practice, however, the Doppler Effect and other noise may cause the zero crossings of the sinc-shaped function to vary in relation to the other sinc-shaped functions represented by other signals received by a UE, which is depicted and described in more detail with respect to FIG. 3B.

Each frequency bin, as shown in graph 300, can represent one orthogonal subcarrier. As described with respect to FIG. 2, the available bandwidth can be divided into uniformly spaced orthogonal subcarriers. For example, each frequency bin can be 15 kHz. Other frequency bins can be used including, for example, 30 kHz, 60 kHz, 120 kHz, 240 kHz, 480 kHz, and so forth. The frequency bins can be any suitable frequency, and with 5G networks the frequency bins can be substantially larger than the examples above.

The scenario depicted by graph 300 is an ideal example of OFDM. In practice, factors can impact the reception of signals at a UE from base stations. For example, environmental factors such as electromagnetic interference, distance, and objects that obstruct signals between the base station and the UE can impact the signal reception. Further, if a UE is moving, the Doppler Effect can impact the signal reception. For example, the Doppler Effect can shift one function away or closer to another function such that the peak of one function does not fall on the expected frequency value as seen in FIG. 3B.

Figure 3B:
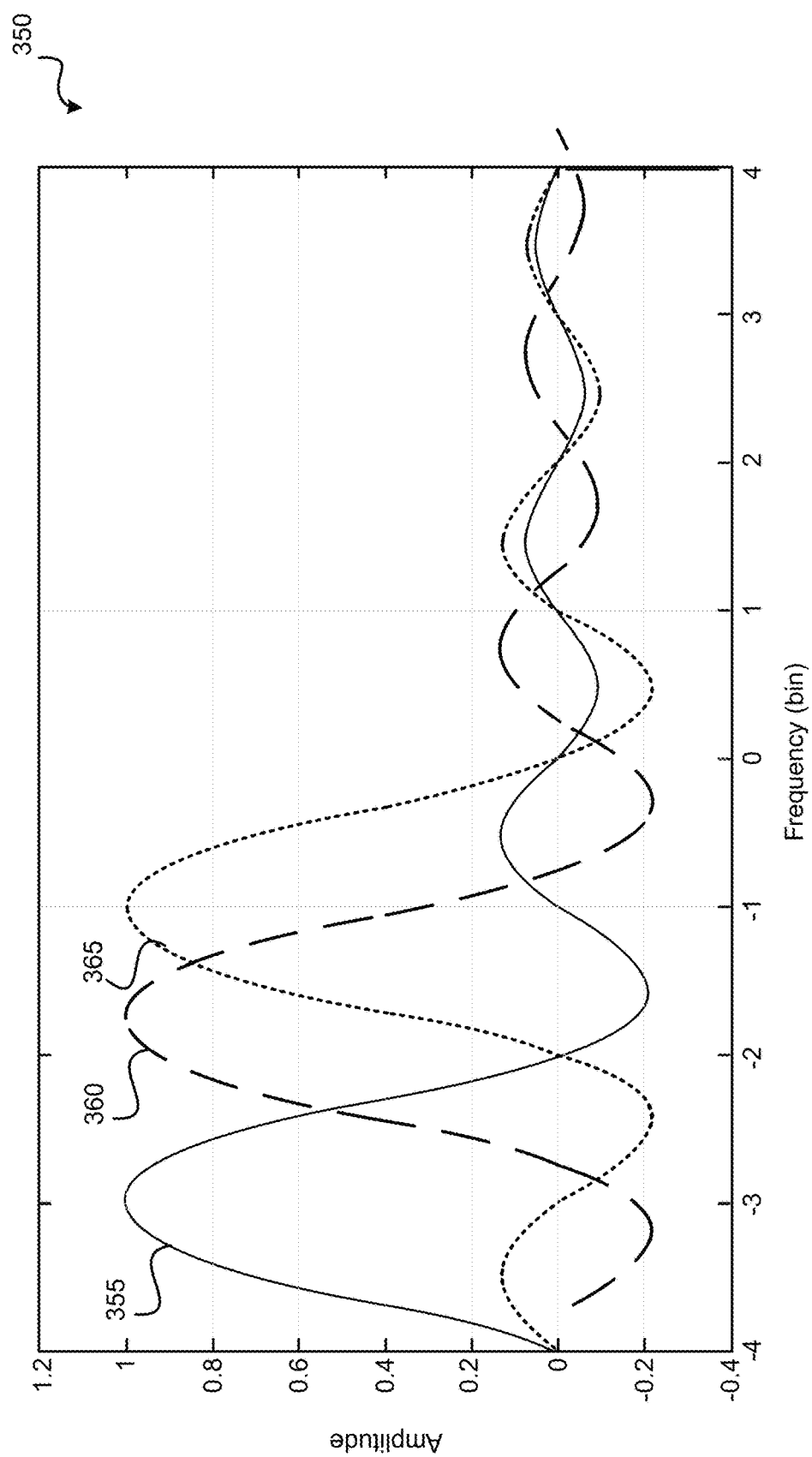
FIG. 3B illustrates another graph representing the amplitude versus the frequency bin of positioning measurement signals as received by a UE using OFDM, according to an embodiment.

FIG. 3B illustrates a graph 350 representing the amplitude versus the frequency bin of positioning measurement signals as received by a UE using OFDM. However, unlike graph 300 of FIG. 3A, graph 350 depicts an example of signals impacted by the Doppler Effect. Graph 350 shows amplitude on the Y-axis over frequency bins of −4 through 4 on the X-axis.

As an example of the impact of the Doppler Effect using graph 350, the function 360 can be offset such that it is not null at frequency bin −3 and/or its peak does not land at frequency bin −2. Instead, for example as shown, function 360 can be shifted to the right. In that case, the signal represented by function 360 can cause noise or interference to the signal represented by function 365 because where function 365 peaks, function 360 is not null so an amplitude from function 360 may register at the UE in addition to the amplitude of the amplitude of function 365.

In traditional OFDM, there is a strict inverse relation between symbol length and subcarrier frequency spacing. Additionally, there is a requirement that an integer number of cycles be completed for each subcarrier over some fixed time period (e.g., the fixed period of time in LTE is 1 slot). This arrangement results in the signal response depicted by graphs 300 and 350.

FIG. 4 illustrates an exemplary table 400 of options of number of slots per sub-frame to frequency spacing values. As discussed with respect to FIGS. 2 and 3, the symbol length is determined based on the number of symbols in a slot. In the previously discussed example, a slot of 0.5 ms with 7 symbols results in each symbol having a length of 0.07 ms (0.5/7 ms). Alternatively, the number of symbols in a slot (where the slot is a defined period of time) can be determined by the symbol length. For example, a slot of 0.5 ms with symbol length of 0.07 ms (71.4 μSec) has 7 symbols (0.5/0.07).

In traditional OFDM for LTE networks, the inverse relation between symbol length and subcarrier frequency spacing allows for the maximum number of symbols within each slot. For example, when subcarrier frequency spacing is 15 kHz, a maximum of 14 symbols per sub-frame can be used. Increasing the number of symbols beyond 14 for 15 kHz subcarriers in a 1 ms timeframe (the sub-frame duration in LTE) results in too many symbols (too short of a symbol duration). When the symbol duration is too short, the symbol reception is not feasible within the system. When calculated out, 14 symbols for 15 kHz subcarriers in a 1 ms timeframe results in a symbol length of 0.07 ms (71.4 µSec), which is the minimum symbol length because a shorter symbol length is not feasible.

FIG. 4 depicts an exemplary table based on an LTE network. In table 400, subcarrier frequency spacing options increase from left to right. From top to bottom, the number of slots per sub-frame increase. In the exemplary table 400, a slot includes 14 symbols. For that reason, box 402 shows the traditional OFDM values for 15 kHz subcarrier spacing. In that scenario of 14 symbols per slot, only 1 slot can be used in a sub-frame. For a 1 ms sub-frame, the symbol duration is 0.07 ms (71.4 µSec). Boxes 404, 406, 408, 410, and 412 are not available options for 15 kHz subcarrier spacing with a 1 ms sub-frame because, as described above, the symbol length would be too short to be feasible. As an example, 2 slots per sub-frame would equal 28 symbols transmitted over 1 ms within a 15 kHz subcarrier. The symbol length would be 0.036 ms (35.7 µSec). Such a configuration is not supportable on a 15 kHz subcarrier.

For a subcarrier frequency spacing of 30 kHz, 2 slots per sub-frame is the supported maximum number of slots because it allows for a minimum symbol length. Over a 30 kHz subcarrier, symbol lengths of 0.036 ms (35.7 µSec) are supported. Accordingly, as shown in box 416, 2 slots per sub-frame with 14 symbols per slot and a 1 ms sub-frame is the maximum supported by a 30 kHz subcarrier. Boxes 418, 420, 422, and 424 are not supported. In traditional OFDM, 2 slots per sub-frame are used as shown in box 416. An option of 1 slot per sub-frame as shown in box 414 can be used. Using such a configuration results in a symbol length of 0.07 ms (71.4 µSec) on a 30 kHz subcarrier.

For a subcarrier frequency spacing of 60 kHz, a maximum of 4 slots per sub-frame is supported. Over a 60 kHz subcarrier, symbol lengths of 0.018 ms are supported. Accordingly, as shown in box 430, 4 slots per sub-frame with 14 symbols per slot and a 1 ms sub-frame is the maximum supported by a 60 kHz subcarrier. Boxes 432, 434, and 436 are not supported. In traditional OFDM, 4 slots per sub-frame are used as shown in box 430. An option of 1 slot per sub-frame as shown in box 426 or an option of 2 slots per sub-frame as shown in box 428 can be used. Using 2 slots per sub-frame results in a symbol length of 0.036 ms (35.7 µSec) on a 60 kHz subcarrier, and using 1 slot per sub-frame results in a symbol length of 0.07 ms (71.4 µSec) on a 60 kHz subcarrier.

Similar results are shown for subcarrier frequency spacing of 120 kHz, 240 kHz, and 480 kHz. Looking at a subcarrier frequency spacing of 480 kHz, in traditional OFDM, 32 slots per sub-frame is used as shown in box 472. Options for 1 slot (box 462), 2 slots (box 464), 4 slots (box 466), 8 slots (box 468), and 16 slots (box 470) can be used. Extending the symbol length (reducing the number of slots per sub-frame) can mitigate the Doppler Effect on UE measurements of position measurement signals as will be discussed further with respect to FIGS. 5A-5F and 6A-6F.

OFDM signals from any signal source are designed such that the peak of one subcarrier aligns with the nulls of the other subcarriers, as shown in FIG. 3A. Ideally, this means that the intra-cell inter-carrier-interference (ICI) level is zero. However, as discussed throughout and explained with reference to FIGS. 3B and 5A-5F, subcarriers from one cell supported by a first base station may not align with the subcarriers from another cell supported by a second base station (i.e., inter-cell) due to, for example, the Doppler Effect and/or a frequency offset between the cell transmit chains. The magnitude of this inter-cell ICI depends on the amount of frequency shift between the two signals, the nominal spacing between the sinc-shaped subcarriers of the signals, and the nominal null-to-null spacing of the sinc-shaped subcarriers of the signals, where the null-to-null spacing of the sinc-shaped subcarrier is determined by its duration. As shown and discussed with respect to FIGS. 3B and 5A-5F, the intra-cell ICI can be seen in the graphs by a first sinc-shaped function representing a signal from one cell moving toward (or away) from a second sinc-shaped function representing the signal from another cell. As the first sinc-shaped function moves toward (or away) from the second (adjacent) sinc-shaped function, the first sinc-shaped function is not null at the peak of the second sinc-shaped function. The amount of frequency shift, $\Delta F$, due to the Doppler Effect, can be found from the Doppler equation (i.e., $\Delta F/F_o = \Delta V/c$). Optionally, the level of inter-cell ICI can be determined by observing the magnitude of a sinc-shaped subcarrier on an adjacent subcarrier location as the first subcarrier is shifted across a range of frequencies based on the frequency bins from the −1 frequency bin through the 1 frequency bin and multiplied by $\Delta F$. For signals with a given subcarrier frequency spacing, differing available symbol lengths can be evaluated (e.g., using a table similar to the table in FIG. 4) using the Doppler Effect equation and identifying the level of inter-cell ICI for each available symbol length by shifting the first subcarrier across the range of frequencies as described above. Optionally, the symbol length with the lowest level of inter-cell ICI can be selected for use.

FIGS. 5A-5F illustrate a series of graphs each representing amplitude versus the frequency of positioning measurement signals using various symbol lengths with OFDM. Starting with FIG. 5A, graph 500 depicts the amplitude versus frequency of positioning measurement signals received at a UE where the subcarrier frequency spacing is 15 kHz, there is 1 slot per sub-frame, each sub-frame is 1 ms, and there are 14 symbols per slot. This configuration is considered strict (or traditional) OFDM. As shown, function 502 peaks at −30 kHz and nulls at −15 kHz, 0 kHz, and every 15 kHz thereafter. Function 504 peaks at −15 kHz (the first null of function 502) and nulls at 0 kHz, 15 kHz, and every 15 kHz thereafter. Function 506 peaks at 0 kHz (the first null of function 504) and nulls at 15 kHz, 30 kHz, and every 15 kHz thereafter. Functions 508 and 510 behave similarly.

The symbol length used for the signals represented in graph 500 is 1 ms/14 symbols or 0.07 ms (71.4 µSec). This is the minimum symbol length (the maximum number of symbols) available for this subcarrier frequency spacing. In FIG. 4, this is represented by box 402. Graph 500 therefore depicts traditional OFDM for 15 kHz frequency spacing and 14 symbols per slot.

As seen in graph 500, any Doppler Effect or other factor that may cause any of functions 502, 504, 506, 508, or 510 to have an offset such that the null does not fall exactly on each 15 kHz increment can cause substantial noise to the signal that is peaking at that increment. Because peaks are close together, even relatively small offsets can make signals difficult to distinguish. For example, if a small offset of 2 kHz for function 504 toward the peak of function 506 exists, graph 500 would display an amplitude from function 504 at the peak of function 506. Accordingly, the signal represented by function 504 may interfere with the signal represented by function 506. The result can be that a UE may incorrectly determine its position based on the inaccurate reading of the signal represented by function 506.

Figure 5A:
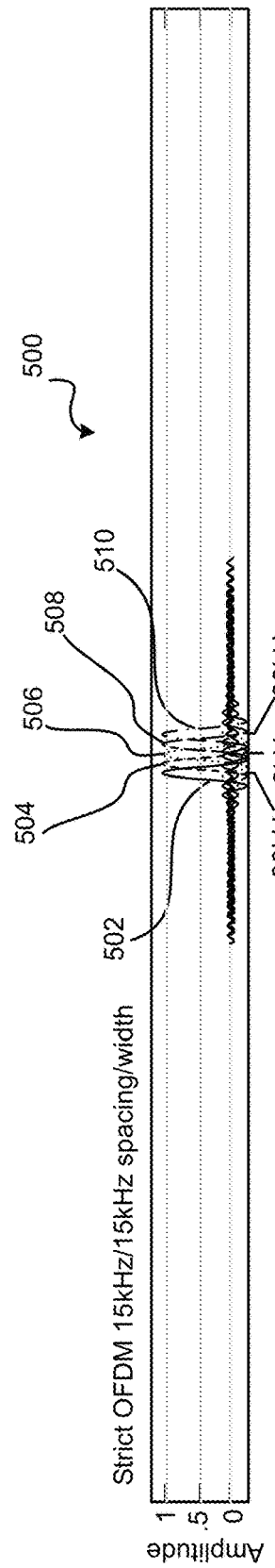
FIGS. 5A-5F illustrate a series of graphs each representing amplitude versus the frequency of positioning measurement signals using various symbol lengths with OFDM, according to an embodiment.
Figure 5B:
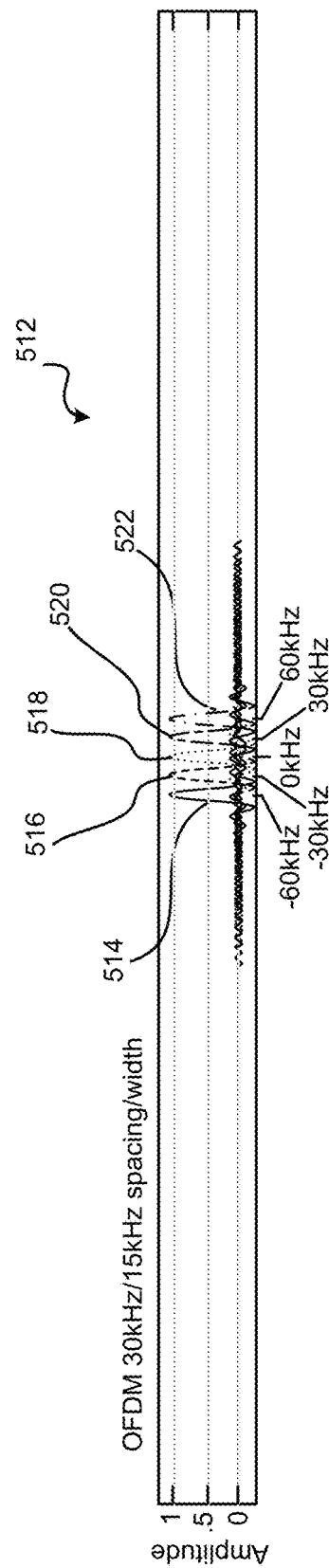

Moving to FIG. 5B, graph 512 depicts sinc-shaped functions 514, 516, 518, 520, and 522. Each function represents the amplitude versus frequency of positioning measurement signals received at a UE where the subcarrier frequency spacing is 30 kHz, there is 1 slot per sub-frame, each sub-frame is 1 ms, and there are 14 symbols per slot. As shown, function 514 peaks at −60 kHz and nulls at −45 kHz, −30 kHz, and every 15 kHz thereafter. Function 516 peaks at −30 kHz (the second null of function 514) and nulls at −15 kHz, 0 kHz, and every 15 kHz thereafter. Function 518 peaks at 0 kHz (the second null of function 516) and nulls at 15 kHz, 30 kHz, and every 15 kHz thereafter. Functions 520 and 522 behave similarly.

The symbol length used for the signals represented in graph 512 is 1 ms/14 symbols or 0.07 ms (71.4 µSec). In FIG. 4, this is represented by box 414. The minimum symbol length for a 30 kHz subcarrier frequency spacing with 14 symbols per slot and a 1 ms sub-frame is 2 slots per sub-frame (0.036 ms (35.7 µSec)). This is represented in FIG. 4 by box 416. Accordingly, the symbol length is longer than minimum symbol length available for this subcarrier frequency spacing. Graph 512 therefore depicts disentangled OFDM for 30 kHz frequency spacing and 14 symbols per slot on a 1 ms sub-frame.

As seen in graph 512, any Doppler Effect or other factor that may cause any of functions 514, 516, 518, 520, or 522 to have an offset such that the null does not fall exactly on each 15 kHz increment can cause noise to a signal that is peaking at that increment. However, because there is a null between each peak where no function peaks, the impact of any offset is dramatically reduced. When peaks fall in the first null, as depicted in graph 500 (or graph 300 of FIG. 3A), because of the sinc-shape of each function the rapid rise in amplitude to peak can mean that an amplitude of up to 1 from an offset function could occur. While that may be uncommon, an offset resulting in an amplitude from an offset function of 0.2 or 0.3 can be common. However, a small offset when the peaks skip a null as shown in graph 512 will have a substantially smaller impact. For example, a small offset of 2 kHz for function 516 can show as amplitude from the signal represented by function 516 on the peak of function 518. However, at the second null, the peak amplitude of function 516 may be only 0.2 kHz. Therefore, a small offset may result in an amplitude interference from function 516 to function 518 of only amplitude 0.05. This smaller interference is less likely to cause the UE to incorrectly determine its position based on the inaccurate reading of the signal represented by function 518.

Figure 5C:
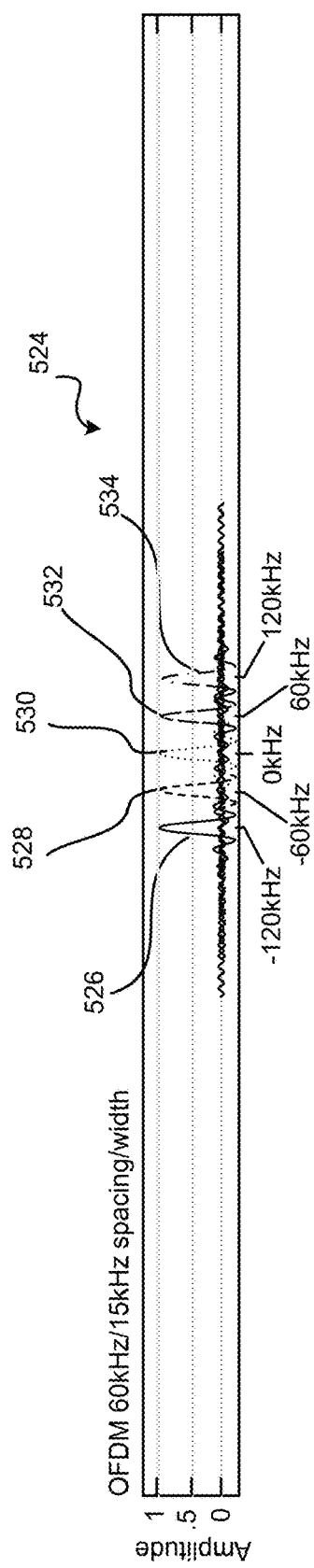

Moving to FIG. 5C, graph 524 depicts sinc-shaped functions 526, 528, 530, 532, and 534. Each function represents the amplitude versus frequency of positioning measurement signals received at a UE where the subcarrier frequency spacing is 60 kHz, there is 1 slot per sub-frame, each sub-frame is 1 ms, and there are 14 symbols per slot. As shown, function 526 peaks at −120 kHz and nulls at −105 kHz, −90 kHz, −75 kHz, −60 kHz, and every 15 kHz thereafter. Function 528 peaks at −60 kHz (the fourth null of function 526) and nulls at −45 kHz, −30 kHz, −15 kHz, 0 kHz, and every 15 kHz thereafter. Function 530 peaks at 0 kHz (the fourth null of function 528) and nulls at 15 kHz, 30 kHz, 45 kHz, 60 kHz, and every 15 kHz thereafter. Functions 520 and 522 behave similarly.

The symbol length used for the signals represented in graph 524 is 1 ms/14 symbols or 0.07 ms (71.4 µSec). This is represented in FIG. 4 by box 426. The minimum symbol length for a 60 kHz subcarrier frequency spacing with 14 symbols per slot and a 1 ms sub-frame is 4 slots per sub-frame (0.018 ms). This is represented in FIG. 4 by box 430. Accordingly, the symbol length is longer than minimum symbol length available for this subcarrier frequency spacing. Graph 524 therefore depicts disentangled OFDM for 60 kHz frequency spacing and 14 symbols per slot on a 1 ms sub-frame.

As seen in graph 524, any Doppler Effect or other factor that may cause any of functions 526, 528, 530, 532, or 534 to have an offset such that the null does not fall exactly on each 15 kHz increment can cause noise to a signal that is peaking at that increment. However, because there are 3 nulls between each peak where no function peaks, the impact of any offset is dramatically reduced even from that of graph 512. At the fourth null, the peak amplitude of function 526 may be only 0.1 kHz. Therefore, a small offset may result in an amplitude interference from function 526 to function 528 of only amplitude 0.02. This smaller interference is even less likely to cause the UE to incorrectly determine its position based on the inaccurate reading of the signal represented by function 528. Rather, the UE is likely to correctly determine its position based on signals from base stations as represented by functions 526, 528, 530, 532, and 534.

Figure 5D:
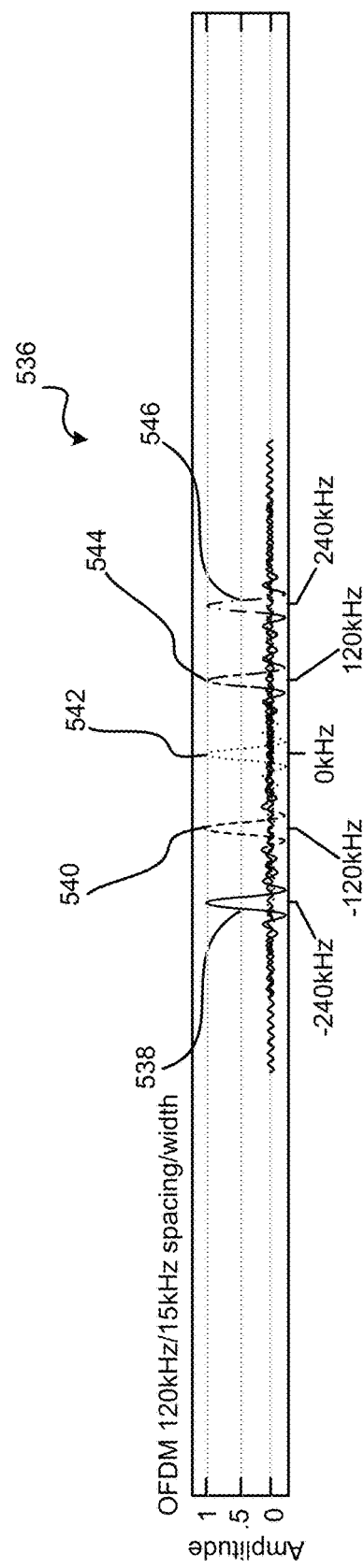

Moving to FIG. 5D, graph 536 depicts sinc-shaped functions 538, 540, 542, 544, and 546. Each function represents the amplitude versus frequency of positioning measurement signals received at a UE where the subcarrier frequency spacing is 120 kHz, there is 1 slot per sub-frame, each sub-frame is 1 ms, and there are 14 symbols per slot. As shown, function 538 peaks at −240 kHz and nulls at −225 kHz, −210 kHz, −195 kHz, −180 kHz, and every 15 kHz thereafter. Function 540 peaks at −120 kHz (the eighth null of function 538) and nulls at −105 kHz, −90 kHz, −75 kHz, 60 kHz, and every 15 kHz thereafter. Function 542 peaks at 0 kHz (the eighth null of function 540) and nulls at 15 kHz, 30 kHz, 45 kHz, 60 kHz, and every 15 kHz thereafter. Functions 544 and 546 behave similarly.

The symbol length used for the signals represented in graph 536 is 1 ms/14 symbols or 0.07 ms (71.4 µSec). This is represented in FIG. 4 by box 438. The minimum symbol length for a 120 kHz subcarrier frequency spacing with 14 symbols per slot and a 1 ms sub-frame is 8 slots per sub-frame (0.009 ms). This is represented in FIG. 4 by box 444. Accordingly, the symbol length is longer than minimum symbol length available for this subcarrier frequency spacing. Graph 536 therefore depicts disentangled OFDM for 120 kHz frequency spacing and 14 symbols per slot on a 1 ms sub-frame.

As seen in graph 536, any Doppler Effect or other factor that may cause any of functions 538, 540, 542, 544, or 546 to have an offset such that the null does not fall exactly on each 15 kHz increment can cause noise to a signal that is peaking at that increment. However, because there are 7 nulls between each peak where no function peaks, the impact of any offset is dramatically reduced even from that of graph 524. At the eighth null, the peak amplitude of function 538 may be only 0.05 kHz. Therefore, a small offset may result in an amplitude interference from function 538 to function 540 of only amplitude 0.005. This smaller interference is even less likely to cause the UE to incorrectly determine its position based on the inaccurate reading of the signal represented by function 538. Rather, the UE is likely to correctly determine its position based on signals from base stations as represented by functions 538, 540, 542, 544, and 546.

Figure 5E:
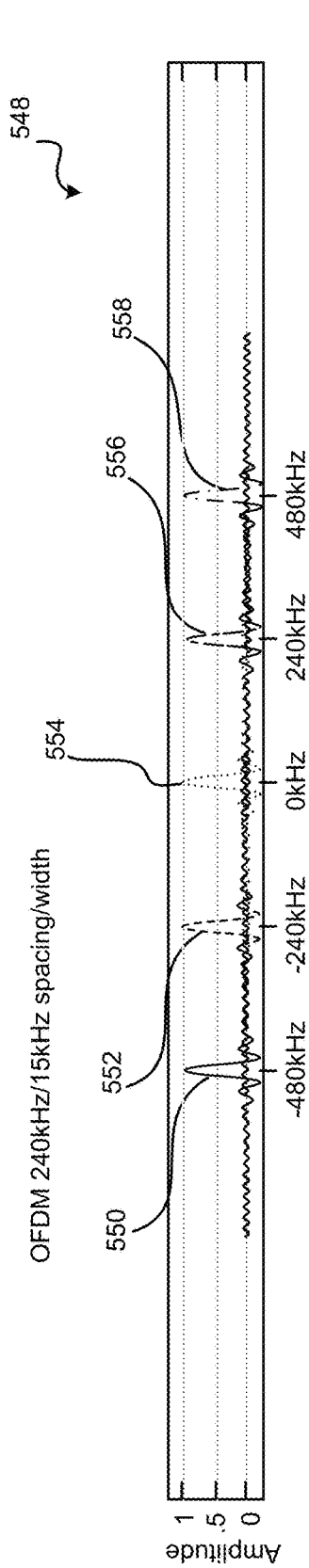

Moving to FIG. 5E, graph 548 depicts sinc-shaped functions 550, 552, 554, 556, and 558. Each function represents the amplitude versus frequency of positioning measurement signals received at a UE where the subcarrier frequency spacing is 240 kHz, there is 1 slot per sub-frame, each sub-frame is 1 ms, and there are 14 symbols per slot. As shown, function 550 peaks at −480 kHz and nulls at −465 kHz, −450 kHz, −435 kHz, −420 kHz, and every 15 kHz thereafter. Function 552 peaks at −240 kHz (the sixteenth null of function 550) and nulls at −225 kHz, −210 kHz, −95 kHz, 80 kHz, and every 15 kHz thereafter. Function 554 peaks at 0 kHz (the sixteenth null of function 552) and nulls at 15 kHz, 30 kHz, 45 kHz, 60 kHz, and every 15 kHz thereafter. Functions 556 and 558 behave similarly.

The symbol length used for the signals represented in graph 548 is 1 ms/14 symbols or 0.07 ms (71.4 μSec). This is represented in FIG. 4 by box 450. The minimum symbol length for a 240 kHz subcarrier frequency spacing with 14 symbols per slot and a 1 ms sub-frame is 16 slots per sub-frame (0.0045 ms). This is represented in FIG. 4 by box 458. Accordingly, the symbol length is longer than the minimum symbol length available for this subcarrier frequency spacing. Graph 548 therefore depicts disentangled OFDM for 240 kHz frequency spacing and 14 symbols per slot on a 1 ms sub-frame.

As seen in graph 548, any Doppler Effect or other factor that may cause any of functions 550, 552, 554, 556, or 558 to have an offset such that the null does not fall exactly on each 15 kHz increment can cause noise to a signal that is peaking at that increment. However, because there are 15 nulls between each peak where no function peaks, the impact of any offset is dramatically reduced even from that of graph 536. At the sixteenth null, the peak amplitude of function 550 may be only 0.005 kHz. Therefore, a small offset may result in an amplitude interference from function 550 to function 552 of only amplitude 0.0005. This smaller interference is unlikely to cause the UE to incorrectly determine its position based on the inaccurate reading of the signal represented by function 550. Rather, the UE is likely to correctly determine its position based on signals from base stations as represented by functions 550, 552, 554, 556, and 558.

Figure 5F:
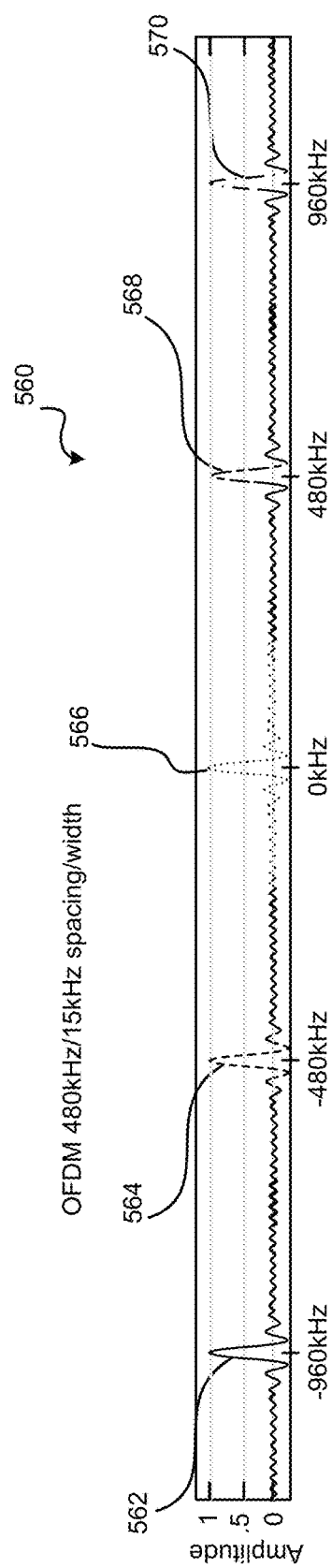

Moving to FIG. 5F, graph 560 depicts sinc-shaped functions 562, 564, 566, 568, and 570. Each function represents the amplitude versus frequency of positioning measurement signals received at a UE where the subcarrier frequency spacing is 480 kHz, there is 1 slot per sub-frame, each sub-frame is 1 ms, and there are 14 symbols per slot. As shown, function 562 peaks at −960 kHz and nulls at −945 kHz, −930 kHz, −915 kHz, −900 kHz, and every 15 kHz thereafter. Function 564 peaks at −480 kHz (the thirty-second null of function 562) and nulls at −465 kHz, −450 kHz, −435 kHz, −420 kHz, and every 15 kHz thereafter. Function 566 peaks at 0 kHz (the thirty-second null of function 564) and nulls at 15 kHz, 30 kHz, 45 kHz, 60 kHz, and every 15 kHz thereafter. Functions 568 and 570 behave similarly.

The symbol length used for the signals represented in graph 548 is 1 ms/14 symbols or 0.07 ms (71.4 μSec). This is represented in FIG. 4 by box 462. The minimum symbol length for a 480 kHz subcarrier frequency spacing with 14 symbols per slot and a 1 ms sub-frame is 32 slots per sub-frame (0.0022 ms). This is represented in FIG. 4 by box 472. Accordingly, the symbol length is longer than the minimum symbol length available for this subcarrier frequency spacing. Graph 560 therefore depicts disentangled OFDM for 480 kHz frequency spacing and 14 symbols per slot on a 1 ms sub-frame.

As seen in graph 560, any Doppler Effect or other factor that may cause any of functions 562, 564, 566, 568, or 570 to have an offset such that the null does not fall exactly on each 15 kHz increment is unlikely to cause noise sufficient to impact the reading of the signal. The 31 nulls between each peak where no function peaks reduces the impact of any offset to practically zero. The UE is likely to correctly determine its position based on signals from base stations as represented by functions 562, 564, 566, 568, and 570 regardless of some offset.

Note the dramatic difference between graph 500 and graph 560. Where within graph 500 the functions 514, 516, 518, 520, and 522 are somewhat difficult to distinguish (i.e., entangled), the functions 562, 564, 566, 568, and 570 of graph 560 are easily distinguished (i.e., disentangled). As such, selecting a longer symbol length than the minimum symbol length allowable for the designated subcarrier frequency spacing results in disentangled OFDM signals. Stated differently, selecting fewer slots per sub-frame than the maximum allowable slots for the subcarrier frequency spacing results in longer symbol lengths that result in disentangled OFDM signals. Entangled signals may be described as signals that are difficult to distinguish or that otherwise impact each other. For example, when signal 502 and signal 504 of FIG. 5A are obtained by a UE, signal 502 may have sufficient amplitude when signal 504 is received to impact the measured value of signal 504. While signal 502 should be null (i.e., zero) when signal 504 has a peak value, the Doppler Effect caused by, for example, UE movement or other signal noise may cause signal 502 to have an amplitude other than zero when signal 504 has a peak. Disentangled signals may be described as signals that are distinguishable or that have little to no impact on each other. For example, when signal 550 and signal 552 of FIG. 5E are obtained by a UE, signal 550 has an amplitude of zero or very near zero when signal 552 is received and therefore has little to no impact on the measured value of signal 552.

FIGS. 6A-6F illustrate a series of graphs each representing power versus frequency of positioning signals using various symbol lengths with OFDM. Starting with FIG. 6A, graph 600 depicts the power versus frequency of positioning measurement signals received at a UE where the subcarrier frequency spacing is 480 kHz and the symbol duration is 2.2 μSec. This is represented in FIG. 4 at box 472. As shown, function 602 peaks at −480 kHz and nulls at every 480 kHz increment (e.g., 0 kHz and 480 kHz). Function 602 gradually reduces in power as frequency increases (or decreases away from the peak of −480 kHz). Function 604 peaks at 0 kHz (the first null of function 602) and nulls at every 480 kHz increment (e.g., −480 kHz and 480 kHz). Function 604 also gradually decreases in power the further away it is from the peak frequency of 0 kHz. Function 606 peaks at 480 kHz (the first null of function 604) and nulls at every 480 kHz spacing.

The symbol length used for the signals represented in graph 600 is 1 ms/32 slots of 14 symbols or 0.0022 ms (2.2 μSec). This is the minimum symbol length (the maximum number of symbols) available for this subcarrier frequency spacing. In FIG. 4, this is represented by box 472. Graph 600 therefore depicts traditional OFDM for 480 kHz frequency spacing and 14 symbols per slot.

As seen in graph 600, any Doppler Effect or other factor that may cause any of functions 602, 604, or 606 to have an offset such that the null does not fall exactly on each 480 kHz increment can cause substantial noise to the signal that is peaking at that increment. For example, a small offset of 20 kHz for function 602 can create noise in the signal represented by function 604. The result can be that a UE may incorrectly determine its position based on the inaccurate reading of the signal represented by function 604.

Figure 6A:
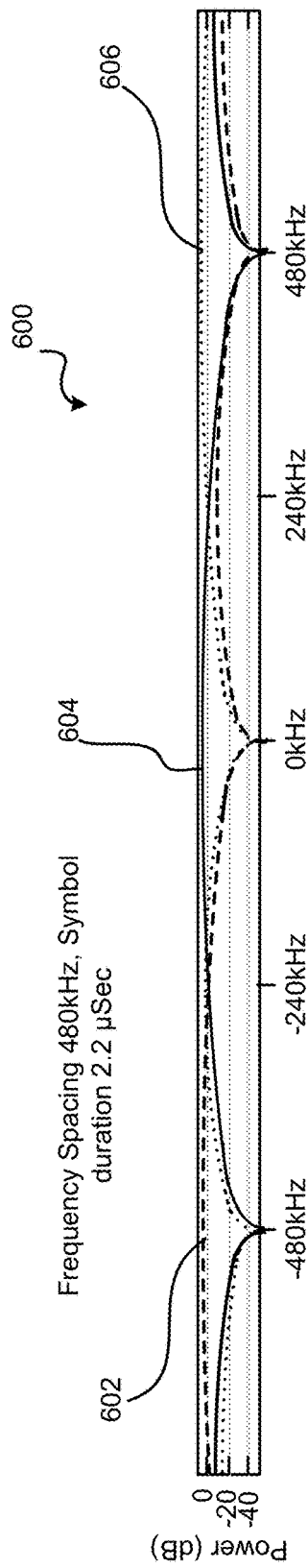
FIGS. 6A-6F illustrate a series of graphs each representing power versus frequency of positioning measurement signals using various symbol lengths with OFDM, according to an embodiment.
Figure 6B:
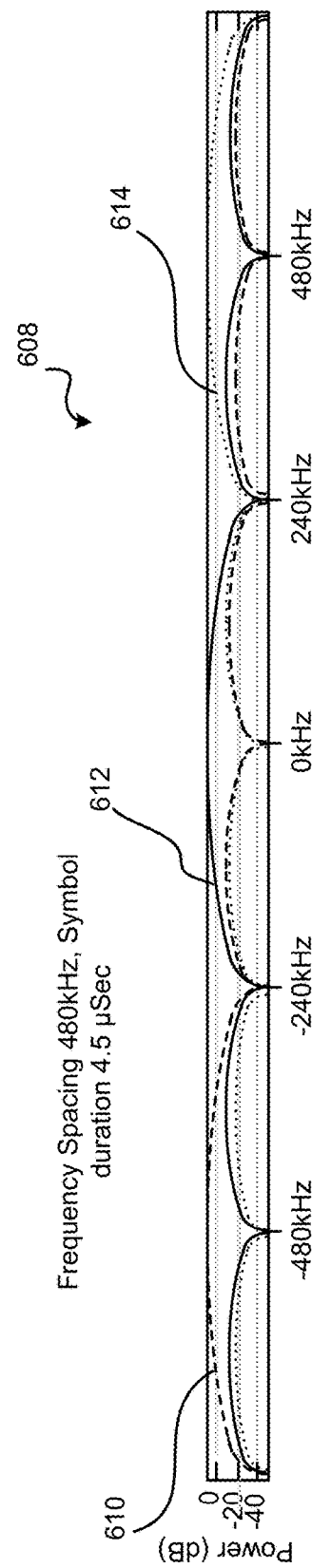

Moving to FIG. 6B, graph 608 depicts the power versus frequency of positioning measurement signals received at a UE where the subcarrier frequency spacing is 480 kHz and the symbol duration is 4.5 μSec. This is represented in FIG. 4 at box 470. As shown, function 610 peaks at −480 kHz and nulls at every 240 kHz increment (e.g., −240 kHz and 0 kHz). Function 610 gradually reduces in power as frequency increases (or decreases away from the peak of −480 kHz). Function 612 peaks at 0 kHz (the second null of function 610) and nulls at every 240 kHz increment (e.g., −240 kHz and 240 kHz). Function 612 also gradually decreases in power the further away it is from the peak frequency of 0 kHz. Function 614 peaks at 480 kHz (the second null of function 612 and the fourth null of function 610) and nulls at every 240 kHz spacing.

The symbol length used for the signals represented in graph 608 is 1 ms/16 slots of 14 symbols or 0.0045 ms (4.5 μSec). The minimum symbol length (the maximum number of symbols) available for this subcarrier frequency spacing is 2.2 μSec as discussed with respect to FIG. 6A. In FIG. 4, this is represented by box 472. Graph 608 therefore depicts disentangled OFDM for 480 kHz frequency spacing and 14 symbols per slot.

As seen in graph 608, any Doppler Effect or other factor that may cause any of functions 610, 612, or 614 to have an offset such that the null does not fall exactly on each 240 kHz increment can cause noise to the signal that is peaking at that increment. For example, a small offset of 20 kHz for function 610 can create noise in the signal represented by function 612, although the impact can be substantially reduced over the same offset when using the symbol length depicted in FIG. 6A. As shown in FIG. 6B, the peak for functions 610 and 614 around 0 kHz is over −20 dB. Accordingly, a small offset can result in noise of −30 dB or more.

Figure 6C:
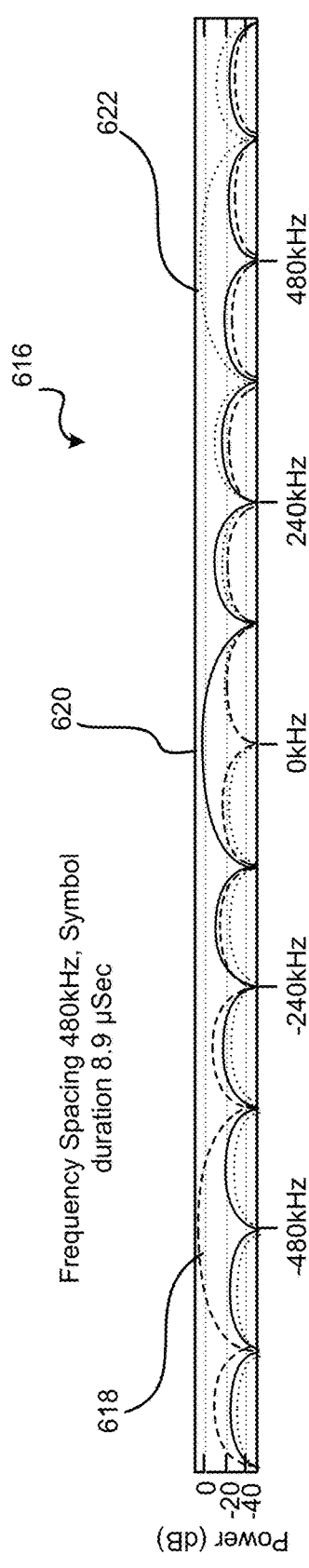

Moving to FIG. 6C, graph 616 depicts the power versus frequency of positioning measurement signals received at a UE where the subcarrier frequency spacing is 480 kHz and the symbol duration is 8.9 μSec. This is represented in FIG. 4 at box 468. As shown, function 618 peaks at −480 kHz and nulls at every 120 kHz increment (e.g., −360 kHz and −240 kHz). Function 618 gradually reduces in power as frequency increases (or decreases away from the peak of −480 kHz). Function 620 peaks at 0 kHz (the fourth null of function 618) and nulls at every 120 kHz increment (e.g., 120 kHz and 240 kHz). Function 620 also gradually decreases in power the further away it is from the peak frequency of 0 kHz. Function 622 peaks at 480 kHz (the fourth null of function 620 and the 8th null of function 618) and nulls at every 120 kHz spacing.

The symbol length used for the signals represented in graph 616 is 1 ms/8 slots of 14 symbols or 0.009 ms (8.9 μSec). The minimum symbol length (the maximum number of symbols) available for this subcarrier frequency spacing is 2.2 μSec as discussed with respect to FIG. 6A. In FIG. 4, this is represented by box 472. Graph 616 therefore depicts disentangled OFDM for 480 kHz frequency spacing and 14 symbols per slot.

As seen in graph 616, any Doppler Effect or other factor that may cause any of functions 618, 620, or 622 to have an offset such that the null does not fall exactly on each 120 kHz increment can cause noise to the signal that is peaking at that increment. However, the peak power of functions 618 and 622 around 0 kHz is approximately −20 dB, so the impact of an offset of signals represented by functions 618 or 622 may be −40 dB or less. The impact of the offset with a symbol length of 8.9 μSec can be substantially reduced over the same offset when using the symbol length of 2.2 μSec as depicted in FIG. 6A.

Figure 6D:
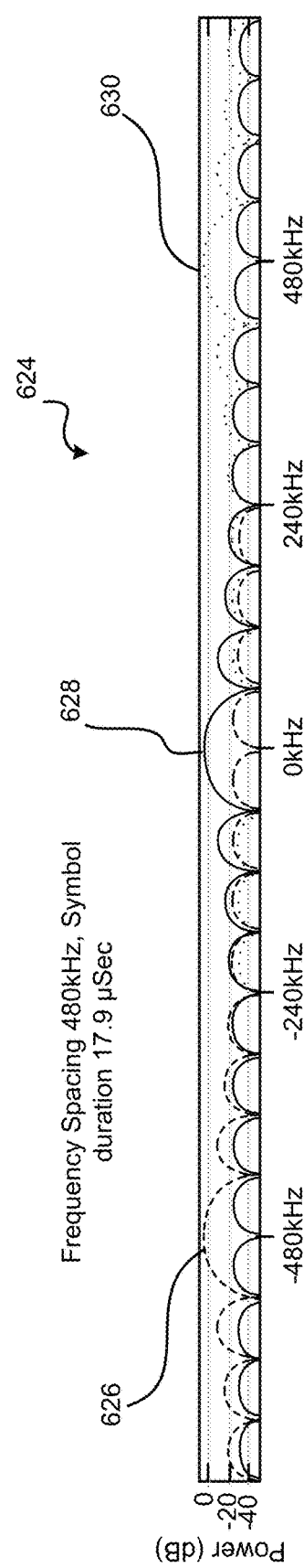

Moving to FIG. 6D, graph 624 depicts the power versus frequency of positioning measurement signals received at a UE where the subcarrier frequency spacing is 480 kHz and the symbol duration is 0.018 ms. This is represented in FIG. 4 at box 466. As shown, function 626 peaks at −480 kHz and nulls at every 60 kHz increment (e.g., −420 kHz and −360 kHz). Function 626 gradually reduces in power as frequency increases (or decreases away from the peak of −480 kHz). Function 628 peaks at 0 kHz (the eighth null of function 626) and nulls at every 60 kHz increment (e.g., 60 kHz and 120 kHz). Function 628 also gradually decreases in power the further away it is from the peak frequency of 0 kHz. Function 630 peaks at 480 kHz (the eighth null of function 628 and the sixteenth null of function 626) and nulls at every 60 kHz spacing.

The symbol length used for the signals represented in graph 624 is 1 ms/4 slots of 14 symbols or 0.018 ms (17.9 μSec). The minimum symbol length (the maximum number of symbols) available for this subcarrier frequency spacing is 2.2 μSec as discussed with respect to FIG. 6A. In FIG. 4, this is represented by box 472. Graph 624 therefore depicts disentangled OFDM for 480 kHz frequency spacing and 14 symbols per slot.

As seen in graph 624, any Doppler Effect or other factor that may cause any of functions 626, 628, or 630 to have an offset such that the null does not fall exactly on each 60 kHz increment can cause noise to the signal that is peaking at that increment. However, the peak power of functions 626 and 630 around 0 kHz is less than −20 dB, so the impact of an offset of signals represented by functions 626 or 630 will likely be less than that of a similar offset for shorter symbol lengths as depicted in FIGS. 6A, 6B, and 6C. The impact of the offset with a symbol length of 17.9 μSec can be substantially reduced over the same offset when using the symbol length of 2.2 μSec as depicted in FIG. 6A.

Figure 6E:
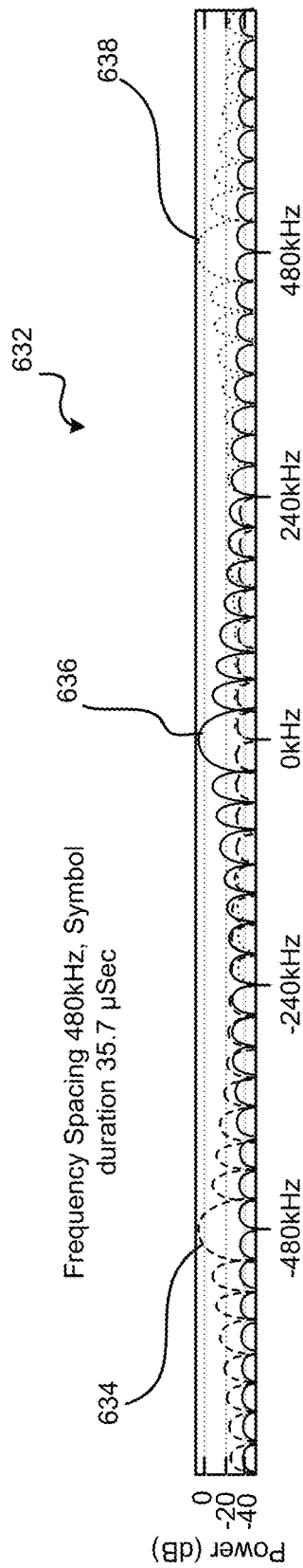

Moving to FIG. 6E, graph 632 depicts the power versus frequency of positioning measurement signals received at a UE where the subcarrier frequency spacing is 480 kHz and the symbol duration is 0.036 ms (35.7 μSec). This is represented in FIG. 4 at box 464. As shown, function 634 peaks at −480 kHz and nulls at every 30 kHz increment (e.g., −450 kHz and −420 kHz). Function 634 gradually reduces in power as frequency increases (or decreases away from the peak of −480 kHz). Function 636 peaks at 0 kHz (the sixteenth null of function 634) and nulls at every 30 kHz increment (e.g., 30 kHz and 60 kHz). Function 636 also gradually decreases in power the further away it is from the peak frequency of 0 kHz. Function 638 peaks at 480 kHz (the sixteenth null of function 636 and the thirty-second null of function 638) and nulls at every 30 kHz spacing.

The symbol length used for the signals represented in graph 632 is 1 ms/2 slots of 14 symbols or 0.036 ms (35.7 μSec). The minimum symbol length (the maximum number of symbols) available for this subcarrier frequency spacing is 2.2 μSec as discussed with respect to FIG. 6A. In FIG. 4, this is represented by box 472. Graph 632 therefore depicts disentangled OFDM for 480 kHz frequency spacing and 14 symbols per slot.

As seen in graph 632, any Doppler Effect or other factor that may cause any of functions 634, 636, or 638 to have an offset such that the null does not fall exactly on each 30 kHz increment can cause noise to the signal that is peaking at that increment. However, the peak power of functions 634 and 638 around 0 kHz is approximately −40 dB, so the impact of an offset of signals represented by functions 634 or 638 will likely be less than that of a similar offset for shorter symbol lengths as depicted in FIGS. 6A, 6B, 6C, and 6D. The impact of the offset with a symbol length of 35.7 µSec can be substantially reduced over the same offset when using the symbol length of 2.2 µSec as depicted in FIG. 6A.

Figure 6F:
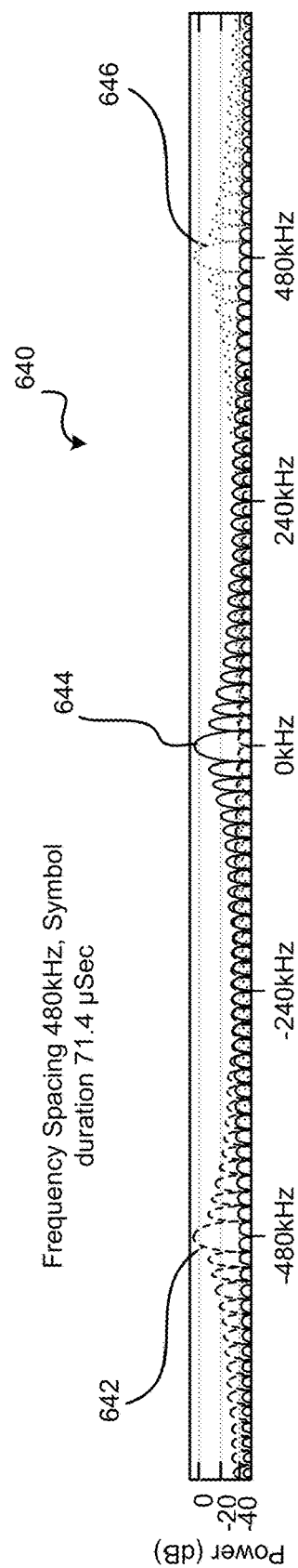

Moving to FIG. 6F, graph 640 depicts the power versus frequency of positioning measurement signals received at a UE where the subcarrier frequency spacing is 480 kHz and the symbol duration is 0.07 ms (71.4 µSec). This is represented in FIG. 4 at box 462. As shown, function 642 peaks at −480 kHz and nulls at every 15 kHz increment (e.g., −465 kHz and −450 kHz). Function 642 gradually reduces in power as frequency increases (or decreases away from the peak of −480 kHz). Function 644 peaks at 0 kHz (the thirty-second null of function 642) and nulls at every 15 kHz increment (e.g., 15 kHz and 30 kHz). Function 644 also gradually decreases in power the further away it is from the peak frequency of 0 kHz. Function 646 peaks at 480 kHz (the thirty-second null of function 644 and the sixty-fourth null of function 642) and nulls at every 15 kHz spacing.

The symbol length used for the signals represented in graph 640 is 1 ms/1 slot of 14 symbols or 0.07 ms (71.4 µSec). The minimum symbol length (the maximum number of symbols) available for this subcarrier frequency spacing is 2.2 µSec as discussed with respect to FIG. 6A. In FIG. 4, this is represented by box 472. Graph 640 therefore depicts disentangled OFDM for 480 kHz frequency spacing and 14 symbols per slot.

As seen in graph 640, any Doppler Effect or other factor that may cause any of functions 642, 644, or 644 to have an offset such that the null does not fall exactly on each 15 kHz increment is unlikely to affect the UE measurement of the signal that is experiencing the noise from another signal. The peak power of functions 642 and 646 around 0 kHz is less than −40 dB, so the impact of an offset of signals represented by functions 642 or 646 will likely be less than that of a similar offset for shorter symbol lengths as depicted in FIGS. 6A, 6B, 6C, 6D, and 6E. The impact of the offset with a symbol length of 71.4 µSec can be substantially reduced over the same offset when using the symbol length of 2.2 µSec as depicted in FIG. 6A.

Note the dramatic difference between graph 600 and graph 640. For example, the chances of an offset of a small kHz value still landing on or near a null of the adjacent or any other signals is increased substantially when the symbol length increases as shown in FIG. 6F as compared to FIG. 6A. Further, the power of adjacent signals when the symbol length increases is less at the peaks for each signal than when the symbol length is shorter. As such, selecting a longer symbol length than the minimum symbol length allowable for the designated subcarrier frequency spacing results in disentangled OFDM signals. Stated differently, selecting fewer slots per sub-frame than the maximum allowable slots for the subcarrier frequency spacing results in longer symbol lengths that result in disentangled OFDM signals.

Figure 7:
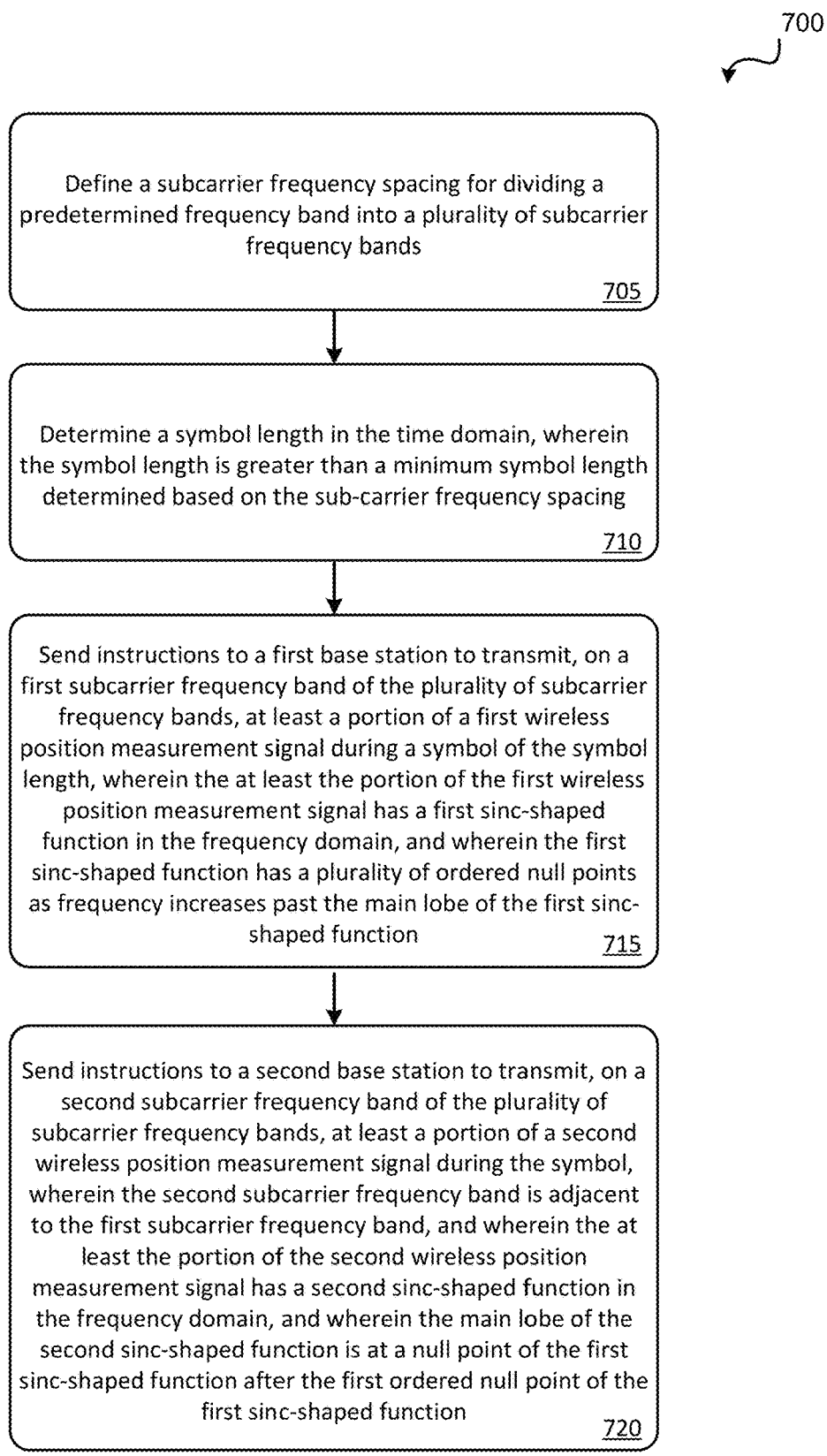
FIG. 7 illustrates a flow diagram of a method for selecting symbol lengths for OFDM signals, according to an embodiment.

FIG. 7 illustrates a flow diagram of a method 700 for selecting symbol lengths for OFDM signals. The method 700 can be performed by a location server or other master controller that is capable of providing configuration information to components on a wireless network. For example, the LMF 120 of FIG. 1 can be the location server (or master controller). Such a location server can provide, for example, the symbol length to be used for positioning measurement signals using OFDM to all components on the network. For example, components such as a UE (e.g., UE 105 of FIG. 1) or a base station (e.g., gNB 110 of FIG. 1) can receive the symbol length information from the location server for use in positioning determination communications to transmit positioning measurement signals.

At block 705, the location server can define a subcarrier frequency spacing for dividing a predetermined frequency band into a plurality of subcarrier frequency bands. As discussed with respect to FIG. 2, the available bandwidth (the predetermined frequency band) can be divided into uniformly spaced orthogonal subcarriers. The uniform spacing can be the defined subcarrier frequency spacing. For LTE, as described in FIG. 2, the subcarriers can be 15 kHz, so the uniform spacing is 15 kHz and each subcarrier frequency band is 15 kHz wide (e.g., 0 kHz-15 kHz). Other example defined subcarrier frequency spacings used in FIGS. 5A-5F and 6A-6F include 30 kHz, 60 kHz, 120 kHz, 240 kHz, and 480 kHz. For 5G networks, the subcarrier frequency bands are expected to be much larger, such as, for example, 60 GHz.

Means for performing the functionality at block 705 may comprise one or more components of a computer system, such as a bus 905, processing unit(s) 910, working memory 935, operating system 940, application(s) 945, and/or other components of the computer system 900 illustrated in FIG. 9 and described in more detail below.

At block 710, the location server can determine a symbol length in the time domain, where the symbol length is greater than a minimum symbol length determined based on the defined subcarrier frequency spacing. For example, as described with respect to FIG. 4, the minimum symbol length for a 15 kHz subcarrier frequency spacing is 0.07 ms (71.4 µSec), which is shown in box 402. As the subcarrier frequency spacing increases, the minimum symbol length decreases. As an example, the minimum symbol length for a 480 kHz frequency spacing is 2.2 µSec as depicted in box 472 of FIG. 4. As an example, when the subcarrier frequency spacing is 480 kHz, the minimum symbol length is 2.2 µSec, and the selected symbol length can be greater than the minimum symbol length. Further, the selected symbol length can be an integer multiple of the minimum symbol length. The selected symbol length can further be an even integer multiple of the minimum symbol length. For example, as shown in FIG. 4, the symbol length options for subcarriers of 480 kHz are 2, 4, 8, 16, and 32 times the minimum symbol length. Therefore, the selected symbol length can be, for example, 35.6 µSec or 71.4 µSec as shown by boxes 464 and 462 respectively of FIG. 4. Selection of the symbol length may not modify or change the subcarrier frequency spacing. In traditional OFDM, increasing the symbol length would shrink the subcarrier frequency spacing. The described solution causes the symbol length to change without changing the subcarrier frequency spacing to correlate to traditional OFDM.

Means for performing the functionality at block 710 may comprise one or more components of a computer system, such as a bus 905, processing unit(s) 910, working memory 935, operating system 940, application(s) 945, and/or other components of the computer system 900 illustrated in FIG. 9 and described in more detail below.

At block 715, the location server can provide instructions to a first base station to transmit, on a first subcarrier frequency band of the plurality of subcarrier frequency bands, at least a portion of a first wireless position measurement signal during a symbol of the symbol length, wherein the at least the portion of the first wireless position measurement signal has a first sinc-shaped function in the frequency domain, and wherein the first sinc-shaped function has a plurality of ordered null points as frequency increases past the main lobe. For example, as shown in FIG. 5F, function 566 can represent a wireless position measurement signal (or a portion of the wireless position measurement signal) sent by a base station on a subcarrier frequency band with spacing 480 kHz during a designated symbol of length 71.4 μSec. Function 566 has a sinc-shape in the frequency domain as shown in graph 560. Function 566 has a main lobe at 0 kHz and null points at 15 kHz, 30 kHz, 45 kHz, and so forth every 15 kHz. The null points are ordered where the first is at 15 kHz, the second is at 30 kHz, the third is at 45 kHz, and so forth. Because position measurement signals may be transmitted over more than one symbol as defined by the resource block, only a portion of the wireless position measurement signal may be transmitted by the base station during the symbol.

Means for performing the functionality at block 715 may comprise one or more components of a computer system, such as a bus 905, processing unit(s) 910, working memory 935, operating system 940, application(s) 945, and/or other components of the computer system 900 illustrated in FIG. 9 and described in more detail below.

At block 720, the location server can provide instructions to a second base station to transmit, on a second subcarrier frequency band of the plurality of subcarrier frequency bands, at least a portion of a second wireless position measurement signal during the symbol, wherein the second subcarrier frequency band is adjacent to the first subcarrier frequency band, and wherein the at least the portion of the second wireless position measurement signal has a second sinc-shaped function in the frequency domain, and wherein the main lobe of the second sinc-shaped function is at a null point of the first sinc-shaped function after the first ordered null point of the first sinc-shaped function. Looking again at FIG. 5F, function 568 represents a signal transmitted by a base station (which can be a second base station) on an adjacent subcarrier frequency band to that of function 566. Function 568 also has a sinc-shape and the main lobe of function 568 is at 480 kHz. Since the first null of function 566 is at 15 kHz, the main lobe of function 568 at 480 kHz is not at the first null of function 566.

Means for performing the functionality at block 720 may comprise one or more components of a computer system, such as a bus 905, processing unit(s) 910, working memory 935, operating system 940, application(s) 945, and/or other components of the computer system 900 illustrated in FIG. 9 and described in more detail below.

Figure 11:
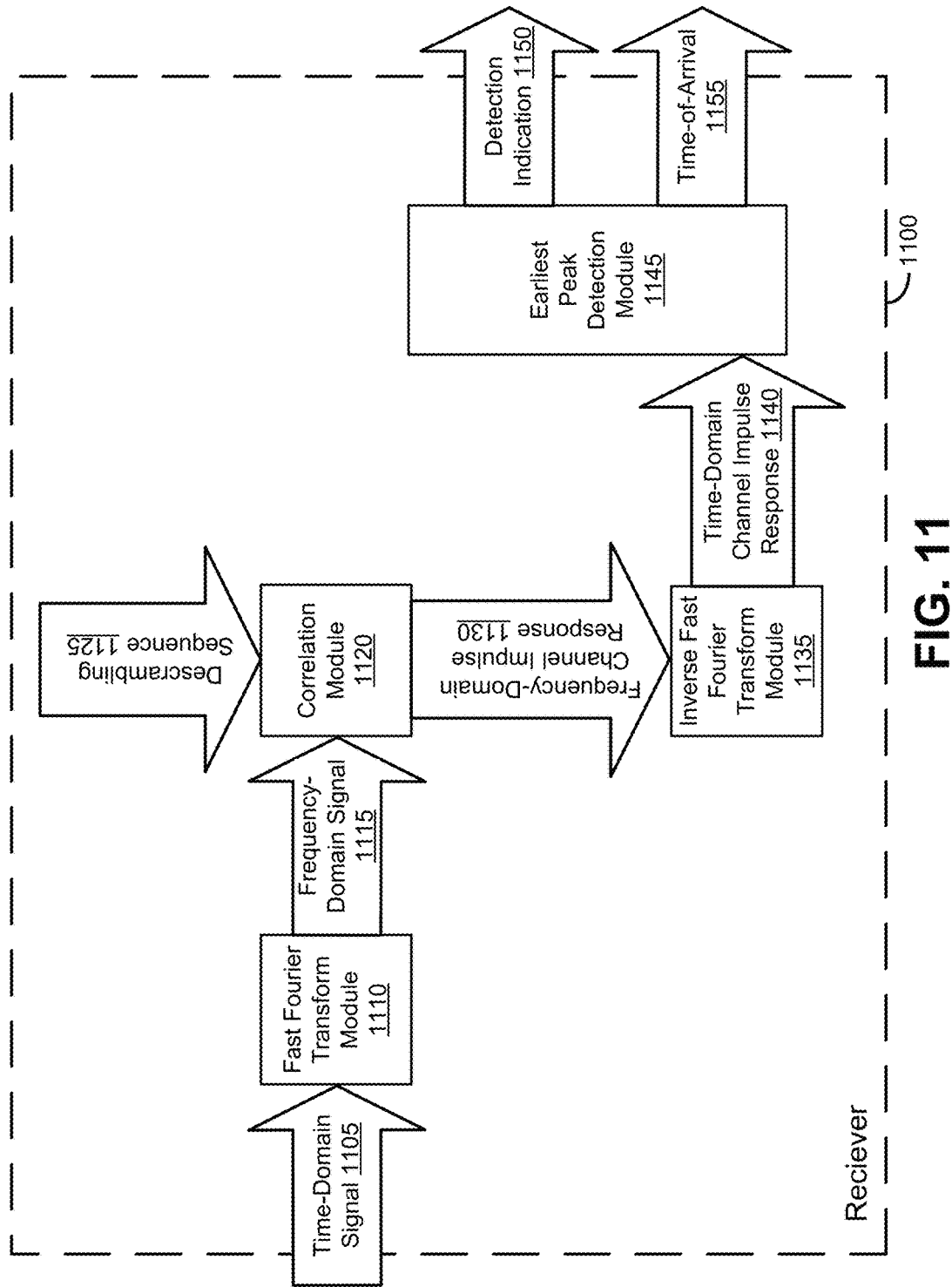
FIG. 11 illustrates an embodiment of a functional block diagram of a receiver.

As described with respect to FIG. 7, the location server can provide the instructions to base stations for transmitting the wireless position measurement signals at designated subcarrier frequency spacings with designated symbol durations. The base stations are then responsible for transmitting the signals as instructed over the wireless network. The UE can receive the signals from the base stations, and also can receive the instructions from the location server so that the UE knows which symbol lengths to listen for and the subcarrier frequency spacings to utilize. Once the UE receives the signals, the UE can demodulate the modulated wireless position signals that were transmitted by the base stations and interpret the payload. FIG. 11 provides more detail with respect to this process. The payload can provide, as discussed above, time values and other information that the UE can use to calculate RTT for the base stations to identify the distance between the UE and the base station. Once the UE determines the distance between the UE and the base stations, knowing the location of the base stations, the UE can calculate a position of the UE. The UE can provide the position information to other components of the network including the location server, base stations, other UEs and so forth. Additionally, various software applications executing on the UE, such as mapping applications, dating applications, navigation applications, social media applications, and so forth, can receive the position information to use within the application.

Figure 8:
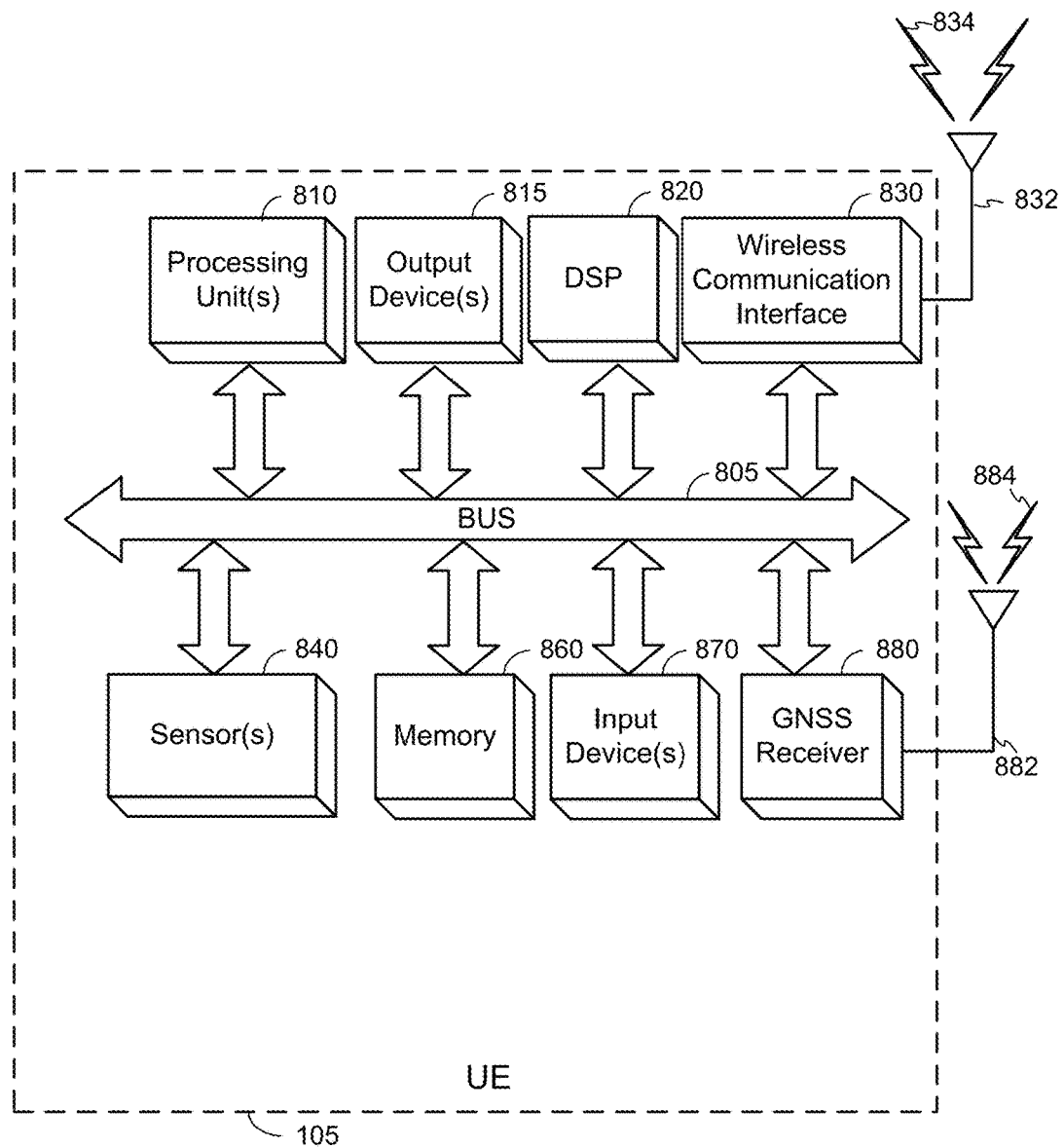
FIG. 8 illustrates an embodiment of a UE.

FIG. 8 illustrates an embodiment of a UE 105, which can be utilized as described herein above (e.g., in association with FIGS. 1-7). For example, the UE 105 can perform one or more of the functions of method 700 of FIG. 7. It should be noted that FIG. 8 is meant only to provide a generalized illustration of various components, any or all of which may be utilized as appropriate. It can be noted that, in some instances, components illustrated by FIG. 8 can be localized to a single physical device and/or distributed among various networked devices, which may be disposed at different physical locations (e.g., located at different parts of a user's body, in which case the components may be communicatively connected via a Personal Area Network (PAN) and/or other means).

The UE 105 is shown comprising hardware elements that can be electrically coupled via a bus 805 (or may otherwise be in communication, as appropriate). The hardware elements may include a processing unit(s) 810, which can include without limitation one or more general-purpose processors, one or more special-purpose processors (such as digital signal processing (DSP) chips, graphics acceleration processors, application specific integrated circuits (ASICs), and/or the like), and/or other processing structure or means. As shown in FIG. 8, some embodiments may have a separate Digital Signal Processor (DSP) 820, depending on desired functionality. Location determination and/or other determinations based on wireless communication may be provided in the processing unit(s) 810 and/or wireless communication interface 830 (discussed below). The UE 105 also can include one or more input devices 870, which can include without limitation a keyboard, touch screen, a touch pad, microphone, button(s), dial(s), switch(es), and/or the like; and one or more output devices 815, which can include without limitation a display, light emitting diode (LED), speakers, and/or the like.

The UE 105 might also include a wireless communication interface 830, which may comprise without limitation a modem, a network card, an infrared communication device, a wireless communication device, a chipset (such as a Bluetooth® device, an IEEE 802.11 device, an IEEE 802.15.4 device, a WiFi device, a WiMax device, cellular communication facilities, and so forth), and/or the like. The wireless communication interface 830 may enable the UE 105 to communicate via the networks described above with regard to FIG. 1. The wireless communication interface 830 may permit data and signaling to be communicated (e.g., transmitted and received) with a network, eNBs, gNBs, ng-eNBs, other network components, computer systems, and/or any other electronic devices described herein. The communication can be carried out via one or more wireless communication antenna(s) 832 that send and/or receive wireless signals 834.

Depending on desired functionality, the wireless communication interface 830 may comprise separate transceivers to communicate with base stations (e.g., ng-eNBs and gNBs) and other terrestrial transceivers, such as wireless devices and access points. The UE 105 may communicate with different data networks that may comprise various network types. For example, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16) network, and/or so forth. A CDMA network may implement one or more radio access technologies (RATs) such as CDMA2000, Wideband CDMA (WCDMA), and so forth. CDMA2000 includes IS-95, IS-2000, and/or IS-856 standards. A TDMA network may implement GSM, Digital Advanced Mobile Phone System (D-AMPS), or some other RAT. An OFDMA network may employ LTE, LTE Advanced, 5G NR, and so forth. 5G NR, LTE, LTE Advanced, GSM, and WCDMA are described in documents from the Third Generation Partnership Project (3GPP). CDMA2000 is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN, and/or WPAN.

The UE 105 can further include sensor(s) 840. Sensors 840 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and/or the like), some of which may be used to complement and/or facilitate the position determination described herein.

Embodiments of the UE 105 may also include a GNSS receiver 880 capable of receiving signals 884 from one or more GNSS satellites (e.g., SVs 190) using an antenna 882 (which could be the same as antenna 832). Positioning based on GNSS signal measurement can be utilized to complement and/or incorporate the techniques described herein. The GNSS receiver 880 can extract a position of the UE 105 using conventional techniques from GNSS SVs of a GNSS system, such as Global Positioning System (GPS), Galileo, Glonass, Quasi-Zenith Satellite System (QZSS) over Japan, Indian Regional Navigational Satellite System (IRNSS) over India, Beidou over China, and/or the like. Moreover, the GNSS receiver 880 can be used with various augmentation systems (e.g., a Satellite Based Augmentation System (SBAS)) that may be associated with or otherwise enabled for use with one or more global and/or regional navigation satellite systems, such as, for example, Wide Area Augmentation System (WAAS), European Geostationary Navigation Overlay Service (EGNOS), Multi-functional Satellite Augmentation System (MSAS), Geo Augmented Navigation system (GAGAN), and/or the like.

The UE 105 may further include and/or be in communication with a memory 860. The memory 860 can include, without limitation, local and/or network accessible storage, a disk drive, a drive array, an optical storage device, a solid-state storage device, such as a random access memory (RAM) and/or a read-only memory (ROM), any of which can be programmable, flash-updateable, and/or the like. Such storage devices may be configured to implement any appropriate data stores, including without limitation, various file systems, database structures, and/or the like.

The memory 860 of the UE 105 also can comprise software elements (not shown in FIG. 8), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 860 that are executable by the UE 105 (and/or processing unit(s) 810 or DSP 820 within UE 105). In an aspect, then, such code and/or instructions can be used to configure and/or adapt a general purpose computer (or other device) to perform one or more operations in accordance with the described methods.

Figure 9:
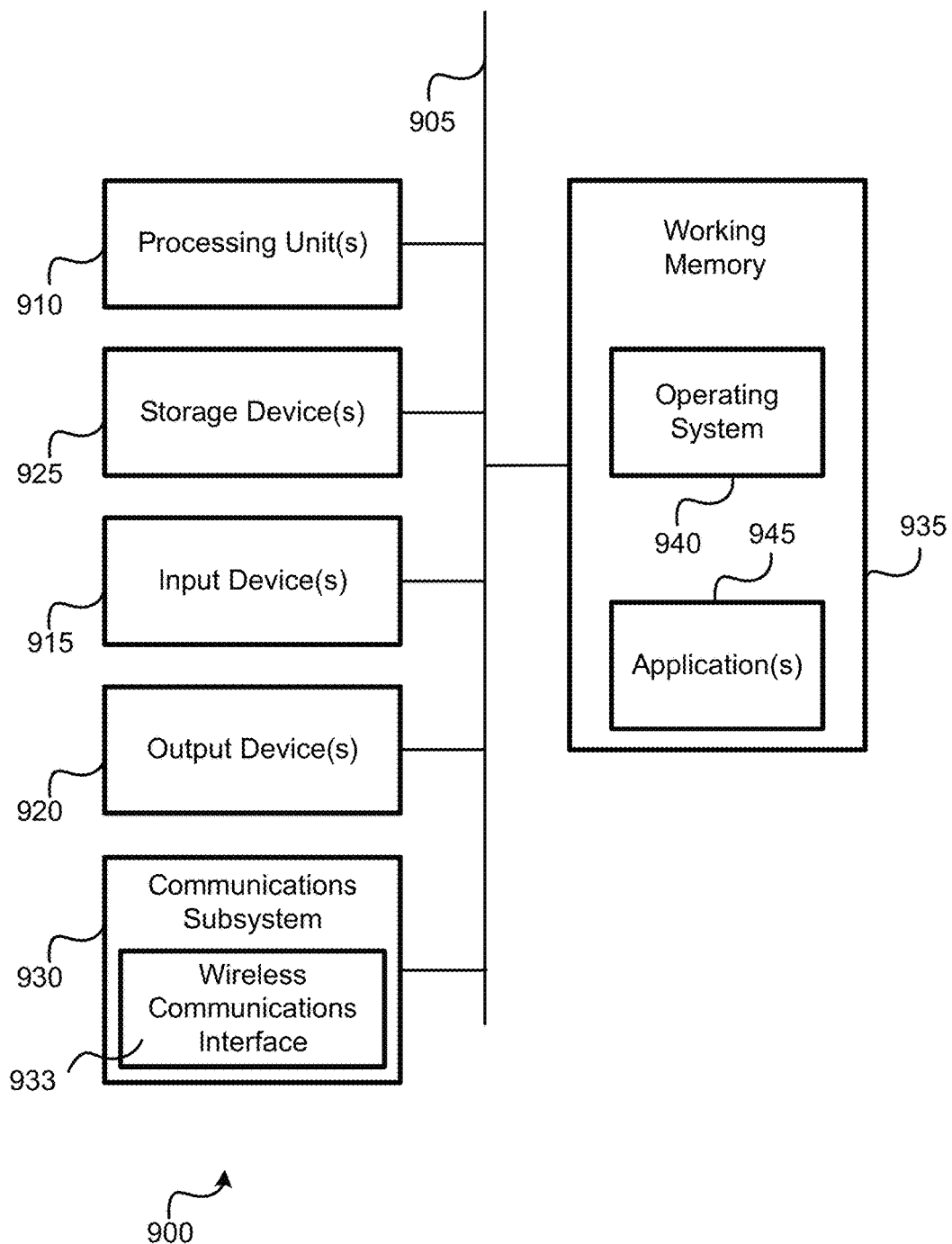
FIG. 9 illustrates an embodiment of a computer system.

FIG. 9 illustrates an embodiment of a computer system 900, which may be utilized and/or incorporated into one or more components of a communication system (e.g., communication system 100 of FIG. 1), including various components of a 5G network, such as the NG-RAN 135 and 5GC 140, and/or similar components of other network types. FIG. 9 provides a schematic illustration of one embodiment of a computer system 900 that can perform the methods provided by various other embodiments, such as the methods described in relation to FIGS. 5 and 6. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner. In addition, it can be noted that components illustrated by FIG. 9 can be localized to a single device and/or distributed among various networked devices, which may be disposed at different physical or geographical locations. In some embodiments, the computer system 900 may correspond to an LMF (e.g., LMF 120 of FIG. 1), a gNB (e.g., gNBs 110 of FIG. 1), an ng-eNB (e.g., ng-eNB 114 of FIG. 1), an eNB, a location server (e.g., an E-SMLC, a SUPL SLP, and so forth), and/or some other type of location-capable device.

The computer system 900 is shown comprising hardware elements that can be electrically coupled via a bus 905 (or may otherwise be in communication, as appropriate). The hardware elements may include processing unit(s) 910, which can include without limitation one or more general-purpose processors, one or more special-purpose processors (such as digital signal processing chips, graphics acceleration processors, and/or the like), and/or other processing structure, which can be configured to perform one or more of the methods described herein, including the methods described in relation to FIG. 5 or 6. The computer system 900 also can include one or more input devices 915, which can include without limitation a mouse, a keyboard, a camera, a microphone, and/or the like; and one or more output devices 920, which can include without limitation a display device, a printer, and/or the like.

The computer system 900 may further include (and/or be in communication with) one or more non-transitory storage devices 925, which can comprise, without limitation, local and/or network accessible storage, and/or can include, without limitation, a disk drive, a drive array, an optical storage device, a solid-state storage device (e.g., a random access memory (RAM) and/or a read-only memory (ROM)), any of which can be programmable, flash-updateable, and/or the like. Such storage devices may be configured to implement any appropriate data stores, including without limitation, various file systems, database structures, and/or the like.

The computer system 900 may also include a communications subsystem 930, which can include support of wireline communication technologies and/or wireless communication technologies (in some embodiments) managed and controlled by a wireless communication interface 933. The communications subsystem 930 may include a modem, a network card (wireless or wired), an infrared communication device, a wireless communication device, and/or a chipset, or the like. The communications subsystem 930 may include one or more input and/or output communication interfaces, such as the wireless communication interface 933, to permit data and signaling to be exchanged with a network, mobile devices, other computer systems, and/or any other electronic devices described herein. Note that the terms "mobile device" and "UE" are used interchangeably herein to refer to any mobile communications device such as, but not limited to, mobile phones, smartphones, wearable devices, mobile computing devices (e.g., laptops, PDAs, tablets), embedded modems, and automotive and other vehicular computing devices.

In many embodiments, the computer system 900 will further comprise a working memory 935, which can include a RAM and/or ROM device. Software elements, shown as being located within the working memory 935, can include an operating system 940, device drivers, executable libraries, and/or other code, such as application(s) 945, which may comprise computer programs provided by various embodiments, and/or may be designed to implement methods, and/or configure systems, provided by other embodiments, as described herein. Merely by way of example, one or more procedures described with respect to the method(s) discussed above, such as the methods described in relation to FIGS. 5 and 6, may be implemented as code and/or instructions that are stored (e.g., temporarily) in working memory 935 and are executable by a computer (and/or a processing unit within a computer such as processing unit(s) 910); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 925 described above. In some cases, the storage medium might be incorporated within a computer system, such as computer system 900. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 900 (e.g., by processing unit(s) 910) and/or might take the form of source and/or installable code, which, upon compilation and/or installation on the computer system 900 (e.g., using any of a variety of generally available compilers, installation programs, compression/decompression utilities, and so forth), then takes the form of executable code.

Figure 10:
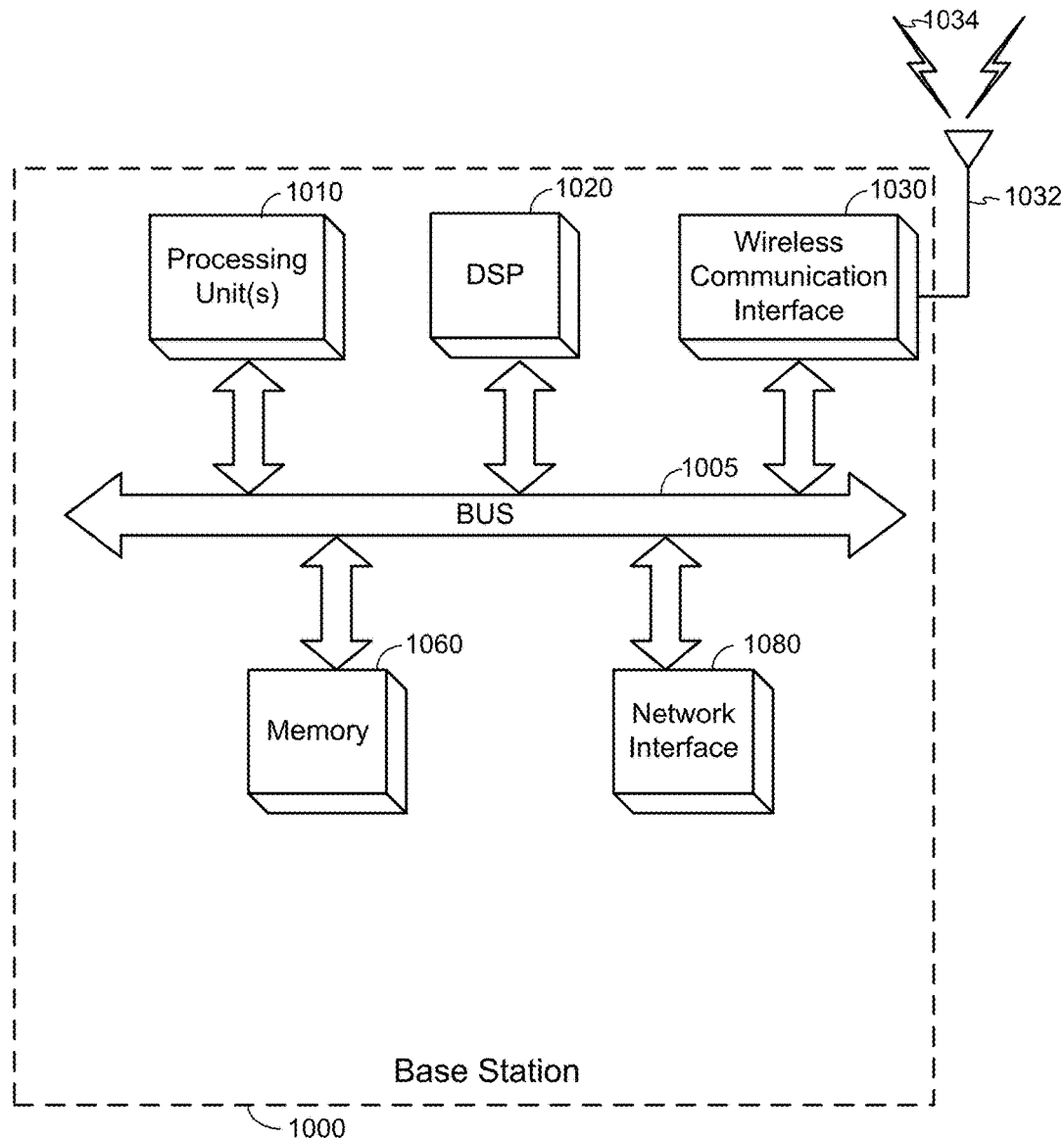
FIG. 10 illustrates an embodiment of a base station.

FIG. 10 illustrates an embodiment of a base station 1000, which can be utilized as described herein above (e.g., in association with FIGS. 1-7). For example, the base station 1000 can perform one or more of the functions of method 700 of FIG. 7. It should be noted that FIG. 10 is meant only to provide a generalized illustration of various components, any or all of which may be utilized as appropriate. In some embodiments, the base station 1000 may correspond to an LMF 120, a gNB 110, and/or an ng-eNB 114 as described herein above.

The base station 1000 is shown comprising hardware elements that can be electrically coupled via a bus 1005 (or may otherwise be in communication, as appropriate). The hardware elements may include a processing unit(s) 1010 which can include without limitation one or more general-purpose processors, one or more special-purpose processors (such as digital signal processing (DSP) chips, graphics acceleration processors, application specific integrated circuits (ASICs), and/or the like), and/or other processing structure or means. As shown in FIG. 10, some embodiments may have a separate Digital Signal Processor (DSP) 1020, depending on desired functionality. Location determination and/or other determinations based on wireless communication may be provided in the processing unit(s) 1010 and/or wireless communication interface 1030 (discussed below). The base station 1000 also can include one or more input devices 1070, which can include without limitation a keyboard, display, mouse, microphone, button(s), dial(s), switch(es), and/or the like; and one or more output devices 1015, which can include without limitation a display, light emitting diode (LED), speakers, and/or the like.

The base station 1000 might also include a wireless communication interface 1030, which may comprise without limitation a modem, a network card, an infrared communication device, a wireless communication device, and/or a chipset (such as a Bluetooth® device, an IEEE 802.11 device, an IEEE 802.15.4 device, a WiFi device, a WiMax device, cellular communication facilities, etc.), and/or the like, which may enable the base station 1000 to communicate as described herein. The wireless communication interface 1030 may permit data and signaling to be communicated (e.g., transmitted and received) UEs, other base stations (e.g., eNBs, gNBs, and ng-eNBs), and/or other network components, computer systems, and/or any other electronic devices described herein. The communication can be carried out via one or more wireless communication antenna(s) 1032 that send and/or receive wireless signals 1034.

The base station 1000 may also include a network interface 1080, which can include support of wireline communication technologies. The network interface 1080 may include a modem, network card, chipset, and/or the like. The network interface 1080 may include one or more input and/or output communication interfaces to permit data to be exchanged with a network, communication network servers, computer systems, and/or any other electronic devices described herein.

In many embodiments, the base station 1000 will further comprise a memory 1060. The memory 1060 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 1060 of the base station 1000 also can comprise software elements (not shown in FIG. 10), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1060 that are executable by the base station 1000 (and/or processing unit(s) 1010 or DSP 1020 within base station 1000). In an aspect, then, such code and/or instructions can be used to configure and/or adapt a general purpose computer (or other device) to perform one or more operations in accordance with the described methods.

FIG. 11 illustrates an embodiment of a functional block diagram of a receiver 1100. The receiver 1100 may be used to process wireless position measurement signals in accordance with embodiments described herein. The receiver 1100 may be, for example, incorporated into a UE such as UE 105. For example, the receiver 1100 may be included in the wireless communication interface 1030 and/or the DSP 1020 as described with respect to FIG. 10. The receiver 1100 illustrates a flow of data through modules within the receiver 1100. The modules indicate processing steps that may be performed by software and/or hardware components of a receiver (e.g., a DSP). Initially, the receiver 1100 may receive a time-domain signal 1105. The time-domain signal 1105 may be, for example, a wireless position measurement signal. The fast Fourier transform module 1110 may perform a fast Fourier transform on the time-domain signal 1105 to transform the time-domain signal 1105 into the frequency-domain signal 1115. The fast Fourier transform module 1110 may then send the frequency-domain signal 1115 to the correlation module 1120. The correlation module 1120 may receive the frequency-domain signal 1115 as well as a descrambling sequence 1125. The descrambling sequence 1125 may include the subcarrier frequency spacing information and the symbol length information over which the time-domain signals 1105 are transmitted from base stations. The correlation module 1120 may use the descrambling sequence 1125 on the frequency-domain signal 1115 to generate the frequency-domain representation of the channel impulse response 1130. The correlation module 1120 may then send the frequency-domain representation of the channel impulse response 1130 to the inverse fast Fourier transform module 1135. The inverse fast Fourier transform module 1135 may perform an inverse fast Fourier transform on the frequency-domain representation of the channel impulse response 1130 to generate the time-domain representation of the channel impulse response 1140. The inverse fast Fourier transform module 1135 may then send the time-domain representation of the channel impulse response 1140 to the earliest peak detection module 1145. The earliest peak detection module 1145 may analyze the time-domain representation of the channel impulse response 1140 to detect the earliest peak, which may indicate the time-of-arrival 1155. In one embodiment, the earliest peak detection module 1145 may reprocess the channel impulse response (CIR) into a channel energy response (CER) for example by multiplying the CIR by its complex conjugate. The earliest peak detection module 1145 may operate on the CIR and/or the CER when detecting the earliest peak. After detecting the earliest peak, the earliest peak detection module 1145 may share the detection indication 1150 and the time-of-arrival 1155 with a positioning engine. The positioning engine may additionally need access to cell-specific information, such as but not limited to, the location of the transmit antennas and their antenna beam orientation and antenna beam openings, for cell operation. Further, upon receiving detection indication 1150 and the time-of-arrival 1155 associated with the time-domain signals 1105 from multiple base stations, the position engine may use multi-lateration or multi-angulation to determine the position of the receiver 1100. The positioning engine may be hosted on the same user device as receiver 1100, and this may be referred to as a UE-based approach. Alternatively, in a UE-assisted approach, the user device containing receiver 1100 may send the measurement information to a positioning engine hosted on a different component of the network, such as a Serving Mobile Location Center (SMLC) or a Secure User Plane Location Platform (SLP).

It will be apparent to those skilled in the art that substantial variations may be made in accordance with specific requirements. For example, customized hardware might also be used and/or particular elements might be implemented in hardware, software (including portable software, such as applets or the like), or both. Further, connection to other computing devices, such as network input/output devices, may be employed.

With reference to the appended figures, components that can include memory can include non-transitory machine-readable media. The terms "machine-readable medium," "computer-readable medium," "computer-readable memory device," and "machine readable media" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punchcards, papertape, any other physical medium with patterns of holes, RAM, PROM, EPROM, EEPROM, FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples. For example, future networks beyond fifth generation (5G) networks may implement embodiments herein.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that, throughout this Specification, discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device. It is understood that a general purpose computer can become a special purpose computer by virtue of installation and execution of software/code/executable instructions that perform such above described actions or processes, such as, for example, the methods described in FIGS. 5-7.

The terms "and" and "or" as used herein may include a variety of meanings that may depend, at least in part, upon the context in which such terms are used. Typically, the term "or," if used to associate a list (e.g., A, B, or C), is intended to (and may) mean A, B, and C, here used in the inclusive sense, as well as A, B, or C, here used in the exclusive sense. Similarly, the term "and," if used to associate a list (e.g., A, B, and C), is intended to (and may) mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, and so forth.

Having described several embodiments, it is understood that various modifications, alternative constructions, and equivalents may be used without departing from the spirit of this disclosure. For example, the above elements may merely be a component of a larger system, wherein, for example, other rules may take precedence over or otherwise modify the application of the various embodiments. Also, a number of steps may be undertaken before, during, or after the above elements are considered. Accordingly, the above description does not limit the scope of the disclosure.

What is claimed is:

1. A method for reducing effects of motion of a mobile device on wireless position measurement signals over a wireless communication network, the method comprising:
   defining a subcarrier frequency spacing for dividing a predetermined frequency band into a plurality of subcarrier frequency bands;
   determining a symbol length in a time domain, wherein the symbol length is greater than a minimum symbol length determined based on the subcarrier frequency spacing, and wherein the minimum symbol length is based on an inverse of a nominal subcarrier frequency spacing;
   sending instructions to a first base station to transmit, on a first subcarrier frequency band of the plurality of subcarrier frequency bands, at least a portion of a first wireless position measurement signal during a symbol of the symbol length, wherein the at least the portion of the first wireless position measurement signal has a first sinc-shaped function in a frequency domain, and wherein the first sinc-shaped function has a plurality of ordered null points as frequency increases past a main lobe of the first sinc-shaped function; and
   sending instructions to a second base station to transmit, on a second subcarrier frequency band of the plurality of subcarrier frequency bands, at least a portion of a second wireless position measurement signal during the symbol, wherein the second subcarrier frequency band is adjacent to the first subcarrier frequency band, and wherein the at least the portion of the second wireless position measurement signal has a second sinc-shaped function in the frequency domain, and wherein a main lobe of the second sinc-shaped function is at a null point of the first sinc-shaped function after a first ordered null point of the first sinc-shaped function.

2. The method of claim 1, wherein the symbol length is an integer multiple of the minimum symbol length.

3. The method of claim 2, wherein the integer multiple is an even integer multiple.

4. The method of claim 1, wherein determining the symbol length in the time domain comprises:
   calculating the minimum symbol length based on the subcarrier frequency spacing; and
   selecting the symbol length greater than the minimum symbol length.

5. The method of claim 1, wherein determining the symbol length does not change the subcarrier frequency spacing.

6. The method of claim 1, wherein determining the symbol length comprises selecting the symbol length such that the second sinc-shaped function is at least at a fourth or greater ordered null point of the first sinc-shaped function.

7. A location server for reducing effects of motion of a mobile device on wireless position measurement signals over a wireless communication network, the location server comprising:
   a memory; and
   one or more processors communicatively coupled to the memory and configured to:
      define a subcarrier frequency spacing for dividing a predetermined frequency band into a plurality of subcarrier frequency bands;
      determine a symbol length in a time domain, wherein the symbol length is greater than a minimum symbol length determined based on the subcarrier frequency spacing, and wherein the minimum symbol length is based on an inverse of a nominal subcarrier frequency spacing;
      send instructions to a first base station to transmit, on a first subcarrier frequency band of the plurality of subcarrier frequency bands, at least a portion of a first wireless position measurement signal during a symbol of the symbol length, wherein the at least the portion of the first wireless position measurement signal has a first sinc-shaped function in a frequency domain, and wherein the first sinc-shaped function has a plurality of ordered null points as frequency increases past a main lobe of the first sinc-shaped function; and
      send instructions to a second base station to transmit, on a second subcarrier frequency band of the plurality of subcarrier frequency bands, at least a portion of a second wireless position measurement signal during the symbol, wherein the second subcarrier frequency band is adjacent to the first subcarrier frequency band, and wherein the at least the portion of the second wireless position measurement signal has a second sinc-shaped function in the frequency domain, and wherein a main lobe of the second sinc-shaped function is at a null point of the first sinc-shaped function after a first ordered null point of the first sinc-shaped function.

8. The location server of claim 7, wherein the symbol length is an integer multiple of the minimum symbol length.

9. The location server of claim 8, wherein the integer multiple is an even integer multiple.

10. The location server of claim 7, wherein the one or more processors configured to determine the symbol length in the time domain are further configured to:
- calculate the minimum symbol length based on the subcarrier frequency spacing; and
- select the symbol length greater than the minimum symbol length.

11. The location server of claim 7, wherein determining the symbol length does not change the subcarrier frequency spacing.

12. The location server of claim 7, wherein determining the symbol length comprises selecting the symbol length such that the second sinc-shaped function is at least at a fourth or greater ordered null point of the first sinc-shaped function.

13. A location server for sending instructions to base stations, the location server comprising:
- means for defining a subcarrier frequency spacing for dividing a predetermined frequency band into a plurality of subcarrier frequency bands;
- means for determining a symbol length in a time domain, wherein the symbol length is greater than a minimum symbol length determined based on the subcarrier frequency spacing, and wherein the minimum symbol length is based on an inverse of a nominal subcarrier frequency spacing;
- means for sending instructions to a first base station to transmit, on a first subcarrier frequency band of the plurality of subcarrier frequency bands, at least a portion of a first wireless position measurement signal during a symbol of the symbol length, wherein the at least the portion of the first wireless position measurement signal has a first sinc-shaped function in a frequency domain, and wherein the first sinc-shaped function has a plurality of ordered null points as frequency increases past a main lobe of the first sinc-shaped function; and
- means for sending instructions to a second base station to transmit, on a second subcarrier frequency band of the plurality of subcarrier frequency bands, at least a portion of a second wireless position measurement signal during the symbol, wherein the second subcarrier frequency band is adjacent to the first subcarrier frequency band, and wherein the at least the portion of the second wireless position measurement signal has a second sinc-shaped function in the frequency domain, and wherein a main lobe of the second sinc-shaped function is at a null point of the first sinc-shaped function after a first ordered null point of the first sinc-shaped function.

14. The location server of claim 13, wherein the symbol length is an integer multiple of the minimum symbol length.

15. The location server of claim 13, wherein the means for determining the symbol length in the time domain further comprises:
- means for calculating the minimum symbol length based on the subcarrier frequency spacing; and
- means for selecting the symbol length greater than the minimum symbol length.

16. The location server of claim 13, wherein determining the symbol length does not change the subcarrier frequency spacing.

17. A non-transitory, computer-readable medium having stored thereon computer-readable instructions that, when executed by one or more processors, are configured to cause a location server to:
- define a subcarrier frequency spacing for dividing a predetermined frequency band into a plurality of subcarrier frequency bands;
- determine a symbol length in a time domain, wherein the symbol length is greater than a minimum symbol length determined based on the subcarrier frequency spacing, and wherein the minimum symbol length is based on an inverse of a nominal subcarrier frequency spacing;
- send instructions to a first base station to transmit, on a first subcarrier frequency band of the plurality of subcarrier frequency bands, at least a portion of a first wireless position measurement signal during a symbol of the symbol length, wherein the at least the portion of the first wireless position measurement signal has a first sinc-shaped function in a frequency domain, and wherein the first sinc-shaped function has a plurality of ordered null points as frequency increases past a main lobe of the first sinc-shaped function; and
- send instructions to a second base station to transmit, on a second subcarrier frequency band of the plurality of subcarrier frequency bands, at least a portion of a second wireless position measurement signal during the symbol, wherein the second subcarrier frequency band is adjacent to the first subcarrier frequency band, and wherein the at least the portion of the second wireless position measurement signal has a second sinc-shaped function in the frequency domain, and wherein a main lobe of the second sinc-shaped function is at a null point of the first sinc-shaped function after a first ordered null point of the first sinc-shaped function.

18. The method of claim 1, wherein the nominal subcarrier frequency spacing is determined based on multiplying a maximum number of slots by a number of symbols per slot such that the nominal subcarrier frequency spacing does not exceed the subcarrier frequency spacing.

19. The method of claim 18, wherein the minimum symbol length is a minimum value for symbol reception at the subcarrier frequency spacing.

20. The method of claim 1, wherein the subcarrier frequency spacing aligns with fifth-generation (5G) standardizations.

* * * * *